(12) United States Patent
Hodjat

(10) Patent No.: US 6,990,670 B1
(45) Date of Patent: Jan. 24, 2006

(54) INTERPRETATION PHASE FOR ADAPTIVE AGENT ORIENTED SOFTWARE ARCHITECTURE

(75) Inventor: Babak Hodjat, Santa Clara, CA (US)

(73) Assignee: iAnywhere Solutions, Inc., Dublin, CA (US)

( * ) Notice: Subject to any disclaimer, the term of this patent is extended or adjusted under 35 U.S.C. 154(b) by 633 days.

(21) Appl. No.: 09/706,948

(22) Filed: Nov. 6, 2000

Related U.S. Application Data

(60) Provisional application No. 60/163,859, filed on Nov. 5, 1999.

(51) Int. Cl.
*G06F 3/00* (2006.01)

(52) U.S. Cl. ............ 719/317; 709/202; 706/10
(58) Field of Classification Search ........ 719/317; 709/202, 317; 706/10
See application file for complete search history.

(56) References Cited

U.S. PATENT DOCUMENTS

| | | | |
|---|---|---|---|
| 5,638,494 A | | 6/1997 | Pinard et al. |
| 5,826,020 A | | 10/1998 | Randell |
| 5,890,146 A | | 3/1999 | Wavish et al. |
| 6,144,989 A | * | 11/2000 | Hodjat et al. ........ 709/202 |
| 6,192,354 B1 | * | 2/2001 | Bigus et al. ......... 706/46 |
| 6,260,059 B1 | * | 7/2001 | Ueno et al. ......... 709/202 |
| 6,304,864 B1 | * | 10/2001 | Liddy et al. ........ 706/15 |
| 6,330,586 B1 | * | 12/2001 | Yates et al. ........ 709/201 |
| 6,691,151 B1 | * | 2/2004 | Cheyer et al. ....... 709/202 |

OTHER PUBLICATIONS

M. Amamiya, and T. Mine, "An O(n) Time and O(n2) Processors Parallel Parsing Algorithm for Context–Free Grammars," in H. Jaakkola et al. eds., Advances in Information Modeling and Knowledge Bases, pp. 351–367, IOS Press, 1991.

N. A. Baas, "Emergence, Hierarchies, and Hyper–structures," C.G. Langton ed., Artificial Life III, pp. 515–537, Addison–Wesley Publishing Company, 1994.

N. A. Baas, "Hyper–structures as a Tool in Nanotechnology," S. Rasmussen, S. R. Hameroff, J. Tuzinki, P. A. Hansson ed.'s, Nanobiology (1994) 3, pp. 49–60.

J. M. Bradshaw, "KAoS: An Open Agent Architecture Supporting Reuse, Interoperability, and Extensibility," Proceedings of Tenth Knowledge Acquisition for Knowledge–Based Systems Workshop, http://ksi.cpsc.ucalgary.ca/KAW/KAW96/KAW96Proc.html, Nov. 8, 1996.

P. Brazdil, M. Gams, S. Sian, L. Torgo, and w. Van De Velde, "Learning in Distributed Systems and Multi–Agent Environments," Machine Learning: EWSL–91 (European Working Session on Learning), Y. Kodratoff (Ed.), Lecture Notes in Artificial Intelligence, Springer–Verlag, 1991.

(Continued)

*Primary Examiner*—Meng-Al T. An
*Assistant Examiner*—Li Zhen
(74) *Attorney, Agent, or Firm*—Warren S. Wolfeld; Haynes Beffel & Wolfeld LLP

(57) ABSTRACT

Roughly described, the interpretation phase of a system using an Adaptive Agent-Oriented Software Architecture allows queried agents to respond to queries before they have all their own responses from their own downchain agents. Alternatively or additionally, the originating agent can include a "depth-or-search" indication with each query, thereby preventing propagation of the query through more than the indicated number of agents. In the latter alternative, the originating agent can subsequently make the same query to the same downchain agents, but with an increased depth-or-search indication, if for example the originating agent is not yet satisfied with the claims it received in response to the first query.

18 Claims, 5 Drawing Sheets

OTHER PUBLICATIONS

D. Bruschi, and G. Pighizzini, "A Parallel Version of Earley's Algorithm," Tech Rep. 114–94, Dipartimento di Scienze dell'Informazione, Univ. of Milan, 1994, pp. 1–22.

D. Cockburn and N. R. Jennings, "ARCHON: A Distributed Artificial Intelligence System for Industrial Applications," G. M. P. O'Hare, N. R. Jennings, ed.'s, Foundations of Distributed Artificial Intelligence, pp. 319–344, John Wiley & Sons, 1996.

S. Franklin, and A. Graesser, "Is it an Agent or just a Program? A Taxonomy for Autonomous Agents," Proceedings of the Third International Workshop on Agents Theories, Architectures, and Languages, Springer–Verlag, 1996.

M. R. Genesereth and S. P. Ketchpel, "Software Agents," Communications of the ACM, vol. 37, No. 7, Jul. 1994., pp 48–53, 147.

B. Hayes–Roth, K. Pfleger, P. Lalanda, P. Morignot and M. Balabanovic, "A Domain–Specific Software Architecture for Adaptive Intelligent Systems," IEEE Transactions on Software Engineering, Apr. 1995, pp. 288–301.

J. E. Hopcroft, and J. D. Ullman, "Formal Languages and Their Relation to Automata," Addison–Wesley Publishing Company, 1969.

A. Cypher. Eager: Programming Repetitive Tasks By Example. Proc. CHI '91, pp. 33–39, 1991.

R. Beale, A. Wood, Agent–based interaction, Proceedings of HCI'94 Glasgow, 1995, pp. 239–245.

A. Wood, "Desktop Agents", School of Computer Science, University of Birmingham, B.Sc. Dissertation, 1991.

Clarke, Smyth, "A Cooperative Computer Based on the Principles of Human Cooperation", International Journal of Man–Machine Studies 38, pp. 3–22, 1993.

N. Eisenger, N. Elshiewy, MADMAN—Multi–Agent Diary Manager, ESRC–92–7i (Economic & Social Resource Council) Internal Report, 1992.

T. Oren, G. Salomon, K. Kreitman, A. Don, "Guides: Characterizing the Interface", in The Art of Human–Computer Interface Design, Brenda Laurel (ed.), 1990 (pp. 367–381).

F. Menczer, R. K. Belew, Adaptive Information Agents in Distributed Textual Environments, Proceedings of the Second International Conference on Autonomous Agents (Agents '98), Minneapolis, MN, May 1998.

B. Hodjat, M. Amamiya, The Self–organizing symbiotic agent, 1998.

P. R. Cohen, A. Cheyer, M. Wang, S. C. Baeg, OAA: An Open Agent Architecture, AAAI Spring Symposium, 1994.

Y, Shoham, Agent–oriented Programming, Artificial Intelligence, vol. 60, No. 1, pp. 51–92, 1993.

A. Cheyer, L. Julia, Multimodal Maps: An Agent–based Approach, 1996.

T. Khedro, M. Genesereth, The federation architecture for interoperable agent–based concurrent engineering systems. In International Journal on Concurrent Engineering, Research and Applications, vol. 2, pp. 125–131, 1994.

P. Brazdil and S. Muggleton: "Learning to Relate Terms in Multiple Agent Environment", Proceedings of Machine Learning—EWSL–91, pp. 424–439, Springer–Verlag, 1991.

S. Cranefield, M. Purvis, An agent–based architecture for software tool coordination, in Proceedings of the Workshop on Theoretical and Practical Foundations of Intelligent Agents, Springer, 1996.

T. Finin, J. Weber, G. Wiederhold, M. Genesereth, R. Fritzson, D. McKay, J. McGuire, S. Shapiro, C. Beck, Specification of the KQML Agent–Communication Language, 1993 (hereinafter "KQML 1993") (visited 1998).

Yannis Labrou and Tim Finin, A Proposal for a new KQML Specification, TR CS–97–03, Feb. 1997, Computer Science and Electrical Engineering Department, University of Maryland Baltimore County.

R.R. Korfhage, Information Storage and Retrieval, John Wiley & Sons, Jun. 1997.

M. Mitchell. An Introduction to Genetic Algorithms. MIT Press, 1996.

D.C. Smith, A. Cypher, J. Spohrer, KidSim: Programming Agents without a programming language, Communcations of the ACM, vol. 37, No. 7, pp. 55–67, 1994.

M. Amamiya, et al., Coordinated Morphological and Syntactic Analysis of Japanese Language, Int. Joint Conf. On Artificial Intelligence 90, pp: 1012–1017, 1990.

L. Balint, Adaptive Dynamic Menu System. Poster Abstracts HCI International '89, Boston, Sep. 18–22, 1989.

* cited by examiner

A seven-segment display

The centralized approach

Simple AAOSA hyperstructure.
Each agent's interpretation policy is to
check input against the number it represents.

An AAOSA hyperstructure designed to reduce the number of functions and condition checks

INTERPRETATION PHASE FOR ADAPTIVE AGENT ORIENTED SOFTWARE ARCHITECTURE

CLAIM OF PRIORITY

This application claims the benefit of U.S. Provisional Application No. 60/163,859, filed Nov. 5, 1999, which is incorporated herein by reference.

BACKGROUND

1. Field of the Invention

The invention relates to software methods and techniques for implementing an agent-oriented architecture, and more particularly to techniques for improving the interpretation phase in such an architecture.

2. References

The following documents are all incorporated by reference herein.

T. Kuhme, Adaptive Action Prompting—A complementary aid to support task-oriented interaction in explorative user interfaces. Report #GIT-GVU-93-19, Georgia Institute of Technology, Dept. of Computer Science, Graphics, Visualization, and Usability Center, 1993.

L. Balint, Adaptive Dynamic Menu System. Poster Abstracts HCI International '89, Boston, Sep. 18–22, 1989.

A. Cypher. Eager: Programming Repetitive Tasks By Example. Proc. CHI '91, pp. 33–39, 1991.

R. Beale, A. Wood, Agent-based interaction, Proceedings of HCI'94 Glasgow, 1995, pp. 239–245.

A. Wood, "Desktop Agents", School of Computer Science, University of Birmingham, B.Sc. Dissertation, 1991.

Clarke, Smyth, "A Cooperative Computer Based on the Principles of Human Cooperation", International Journal of Man-Machine Studies 38, pp.3–22, 1993.

N. Eisenger, N. Elshiewy, MADMAN—Multi-Agent Diary Manager, ESRC-92-7i (Economic & Social Resource Council) Internal Report, 1992.

T. Oren, G. Salomon, K. Kreitman, A. Don, "Guides: Characterizing the Interface", in The Art of Human-Computer Interface Design, Brenda Laurel (ed.), 1990 (pp.367–381).

F. Menczer, R. K. Belew, Adaptive Infornation Agents in Distributed Textual Envirorments, Proceedings of the Second International Conference on Autonomous Agents (Agents '98), Minneapolis, Minn., May 1998.

P. Brazdil, M. Gams, S. Sian, L. Torgo, W. van de Velde, Learning in Distributed Systems and Multi-Agent Environments, *Machine Learning: EWSL-91 (European Working Session on Learning), Y. Kodratoff (Ed.), Lecture Notes in Artificial Intelligence*, Springer-Verlag, 1991.

B. Hodjat, M. Amamiya, The Self-organizing symbiotic agent, 1998.

P. R. Cohen, A. Cheyer, M. Wang, S. C. Baeg, OAA: An Open Agent Architecture, AAAI Spring Symposium, 1994.

S. Franklin, A. Graesser, is it an Agent or just a Program? A Taxonomy for Autonomous Agents, in: Proceedings of the Third International Workshop on Agents Theories, Architectures, and Languages, Springer-Verlag, 1996.

B. Hayes-Roth, K. Pfleger, P. Lalanda, P. Morignot, M. Balabanovic, A domain-specific Software Architecture for adaptive intelligent systems, IEEE Transactions on Software Engineering, April 1995, pp. 288–301.

Y. Shoham, Agent-oriented Programming, Artificial Intelligence, Vol. 60, No. 1, pages 51–92, 1993.

M. R. Genesereth, S. P. Ketchpel, Software Agents, Communications of the ACM, Vol. 37, No. 7, July 1994, pp. 48–53, 147.

A. Cheyer, L. Julia, Multimodal Maps: An Agent-based Approach, 1996.

T. Khedro, M. Genesereth, The federation architecture for interoperable agent-based concurrent engineering systems. In International Journal on Concurrent Engineering, Research and Applications, Vol. 2, pages 125–131, 1994.

P. Brazdil and S. Muggleton: "Learning to Relate Terms in Multiple Agent Environment", Proceedings of Machine Learning—EWSL-91, pp. 424–439, Springer-Verlag, 1991.

S. Cranefield, M. Purvis, An agent-based architecture for software tool coordination, in Proceedings of the Workshop on Theoretical and Practical Foundations of Intelligent Agents, Springer, 1996.

T. Finin, J. Weber, G. Wiederhold, M. Genesereth, R. Fritzson, D. McKay, J. McGuire, S. Shapiro, C. Beck, Specification of the KQML Agent-Communication Language, 1993 (hereinafter "KQML 1993") (visited 1998).

Yannis Labrou and Tim Finin, A Proposal for a new KQML Specification, TR CS-97-03, February 1997, Computer Science and Electrical Engineering Department, University of Maryland Baltimore County.

R. R. Korfhage, Information Storage and Retrieval, John Wiley & Sons, June 1997.

M. Mitchell. An Introduction to Genetic Algorithms. MIT Press, 1996.

D. C. Smith, A. Cypher, J. Spohrer, KidSim: Programming Agents without a programming language, Communications of the ACM, Vol. 37, No. 7, pages 55–67, 1994.

M. Amamiya, et al., Coordinated Morphological and Syntactic Analysis of Japanese Language, Int. Joint Conf. On Artificial Intelligence 90, pp. 1012–1017, 1990.

M. Amamiya, T. Mine:, An O(n) time and $O(n^2)$ processors parallel parsing algorithm for context-free grammars, in H. Jaakkola et al. eds., *Advances in Information Modelling and Knowledge Bases*, pp. 351–367, IOS Press, 1991.

N. A. Baas. Emergence, Hierarchies, and Hyper-structures. C. G. Langton ed., *Artificial Life III*. Addison Wesley, 1994.

N. A. Baas. Hyper-structures as Tools in Nanotechnology and Nanobiology. S. Rasmussen, S. R. Hameroff, J. Tuzinki, P. A. Hansson ed.'s, *Towards a Nanobiology: Coherent and Emergent Phenomena in Bimolecular Systems*. MIT Press, 1995.

J. M. Bradshaw. KaoS: An Open Agent Architecture Supporting Reuse, Interoperability, and Extensibility. *Proceedings of Tenth Knowledge Acquisition for Knowledge-Based Systems Workshop*, 1996.

D. Bruschi, G. Pighizzini, A Parallel Version of Earley's Algorithm, Tech Rep. 114-94, Dipartimento di Scienze dell'Informazione, Univ. of Milan, 1994.

D. Cockburn and N. R. Jennings. ARCHON: A Distributed Artificial Intelligence System for Industrial Applications. G. M. P. O'Hare, N. R. Jennings, ed's, *Foundations of Distributed Artificial Intelligence*. pp. 319–344. John Wiley & Sons, 1996.

J. E. Hopcroft, J. D. Ullman, Formal Languages and Their Relation to Automata, Addison-Wesley, 1969.

V. R. Lesser. Reflections on the Nature of Multi-Agent Coordination and its implications for an Agent Architecture,

*Autonomous Agents and Multi-Agent Systems.* pp. 89–111, Kluwer Academic Publishers, 1, 1998.

A. G, Manousopoulou, G. Papakonstantinou, P. Tsanakas, A chart-like parser for context sensitive grammars, *Proceedings of the 1st workshop on tabulation in parsing and deduction* (*TAPD '98*), pp. 89–95, Paris, France, 1998.

D. Martin and D. Moran. Building distributed software systems with the open agent architecture. *Proc. of the Third International Conference on the Practical Application of Intelligent Agents and Multi-Agent Technology*. The Practical Application Company Ltd., Blackpool, Lancashire, UK, March 1998.

3. Description of Related Art

Most human-machine interfaces in use today are relatively complicated and difficult to use. In U.S. patent application Ser. No. 09/183,764, filed Oct. 30, 1998, incorporated by reference herein, there is described a method for processing a message, by a network of agents each of which has a view of its own domain of responsibility. The method typically involves two main phases: an interpretation phase and a delegation phase. In the interpretation phase, an initiator agent which receives an input request and does not itself have a relevant interpretation policy, queries its downchain agents whether the queried agent considers such message, or part of such message, to be in its domain of responsibility. Each queried agent recursively determines whether it has an interpretation policy of its own that applies to the request, and if not, further queries its own further downchain neighboring agents. The further agents eventually respond to such further queries, thereby allowing the first-queried agents to respond to the initiator agent. The recursive invocation of this procedure ultimately determines a path, or a set of paths, through the network from the initiator agent to one or more leaf agents. In the event of a contradiction, the network is often able to resolve many of such contradictions according to predetermined automatic algorithms. If it cannot resolve a contradiction automatically, it learns new interpretation policies necessary to interpret the subject message properly. Such learning can include interaction with a user, and can be designed to localize the learning as closely upchain to the correct leaf agent in the network as possible. After the appropriate paths through the network are determined, in the delegation phase the request is then transmitted down each determined path, with each agent along the way taking any local action thereon and passing the message on to the next agent in the path.

SUMMARY OF THE INVENTION

According to the invention, roughly described, the interpretation phase of the above-described process is enhanced by allowing queried agents to respond to queries before they have all their own responses from their own downchain agents. In one embodiment, queried agents respond at a fixed time after receipt of a query, whether or not they have received all responses from their own downchain agents. In another embodiment, a queried agent makes claims to its upchain inquiring agent upon receipt of each claim that the queried agent receives from its own downchain agents. In another embodiment, a queried agent can receive a particular query more than once, and in response to each, the agent responds with whatever claims it then has. Other variations are also possible, as well as combinations of these and other variations. In order to limit the duration of time during which queries are active in the network, and thus during which new claims can still be made, the agent originating a query can send a "forget-problem" message down into the network after some period of time. Alternatively or additionally, the originating agent can include a "depth-of-search" indication with each query, thereby preventing propagation of the query through more than the indicated number of agents. In the latter alternative, the originating agent can subsequently make the same query to the same downchain agents, but with an increased depth-of-search indication, if for example the originating agent is not yet satisfied with the claims it received in response to the first query.

BRIEF DESCRIPTION OF THE DRAWINGS

The invention will be described with reference to the drawings, in which.

DETAILED DESCRIPTION

1. Introduction

Agent abstraction is a natural extension of object-oriented technology, encapsulating the agent's knowledge within an active process and providing a standard interface for communication. The concept of large ensembles of semi-autonomous intelligent agents working together is emerging as an important model for building the next generation of sophisticated software applications.

An important difference between agents in an agent-oriented system and objects is that agents contain predefined structures and functionality that gives them the ability to communicate. In many cases, this commonality is extended to include such processes as learning and planning. Thus, although the environment and responsibilities of different agents in an agent-oriented system may be different they can still have much in common. In the Adaptive Agent Oriented Software Architecture (AAOSA) paradigm we encourage the exploitation of this feature as much as possible so that the designer of an AAOSA based system is faced with as simple a task as possible.

AAOSA is a software methodology that proposes the break-up of complex software into a community of simpler, independent, collaborating, adaptive, message-driven components (AAOSA Agents). The goal of AAOSA is to provide software designers with the necessary coordination amongst AAOSA agents representing sub-domains of the software being developed in order to better meet the needs of the entire application. This coordination is provided through pre-defined messaging schemes between AAOSA agents.

Figure 1:
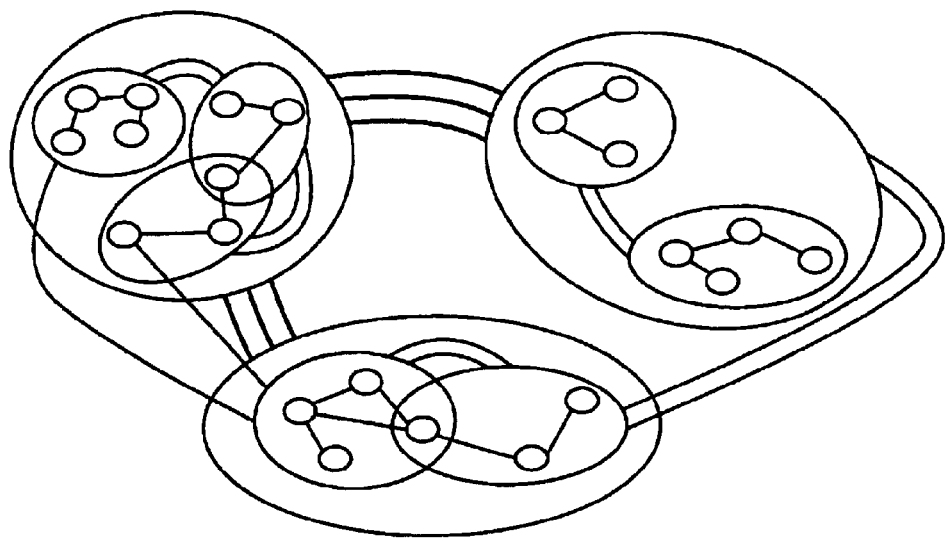
FIG. 1 shows an example of a third-order interaction graph of a hyperstructure.
Figure 2:
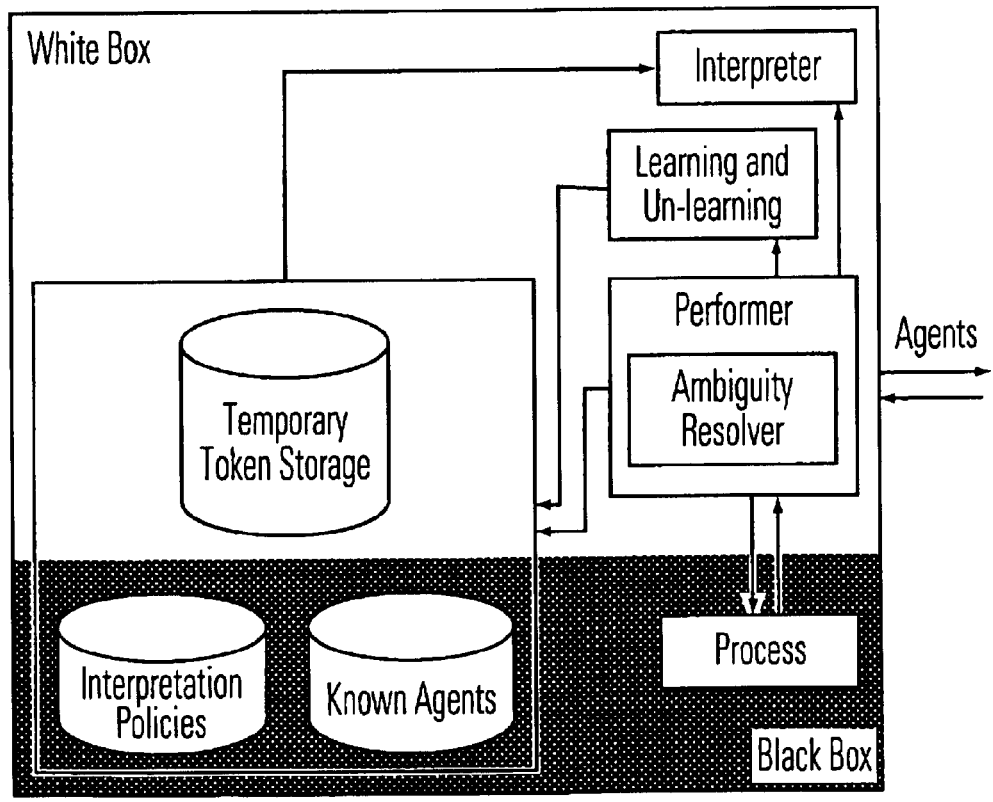
FIG. 2 illustrates a division of functions within an agent according to the invention.

We divide an agent into a white box, which contains standard data structures and methods for communications, interpretations, and learning provided by AAOSA, and a black box, which is defined by the designer and contains the agent specific communications, interpretations, and processes. FIG. 2 illustrates an agent having a white box and a black box and illustrates some of the functions included in each. AAOSA, being object oriented in design, allows the black box to override, inherit from, or change any module in the white box (i.e., the data structures and methods in the white box are inherited within the black box, which can therefore access and modify them). Bass has shown that a problem is covered by a hyper-structure of computing elements. FIG. 1 shows an example of a third-order interaction graph of a hyper-structure allowing cumulative interactions and overlapping aggregates. Circles represent first order hyper-structures or computing modules of the lowest complexity in the given domain. We propose the representation of each level of a given hyper-structure by AAOSA agents.

The designer of an AAOSA application will:

Break down the software to its manageable sub-domain elements (i.e., AAOSA Agents), Define which agents will be in direct communication with each other. These direct links are important because they concretize the designer's view of the different hyperstructure levels. The higher the level, the higher priority an agent will have in interpreting and processing input.

Devise interpretation policies for each agent by considering the input to the application from each agent's point of view to decide if this agent is responsible for processing all or parts of this input. An agent claims a particular input if it, or one or a number of agents down-chain to it are responsible for processing that input. In other words an agent claiming an input would, upon delegation, either process that input, or delegate it down-chain to one or a number of agents that had in turn claimed that input, or both.

AAOSA, throughpredefined communication schemes, should pin point the agent or agents in this hyper-structure that are responsible for processing a certain input, and provide the necessary coordination between them in order to achieve desired output. Our hope is that in this way the designer will have to deal mostly with the breaking up and design of the software elements themselves rather than the complexities of how to coordinate them. Therefore another important difference between AAOSA agents and objects in the Object Oriented methodology is that an agent does not have to know which agents are responsible for a certain process or data structure, or that process' invocation details.

By taking each software module to be an agent we can take advantage of a number of desirable features which we will impose on the designer as definitions of AAOSA agents: Each agent should be independent of the others and the only means of communication is messaging, handled by the white-box. This will provide for the possibility of parallel, distributed, and even mobile modules. Agents can be processing several requests at the same time.

No centralized control is enforced over the resulting network of AAOSA agents covering the scope of a software application. In this architecture, agents introduce themselves and their abilities to one another at the beginning or during execution. Agents can therefore be added to or removed from the application at runtime. This is one of the major differences between AAOSA and its precursor the Open Agent Architecture.

Another relative of AAOSA is ARCHON (Architecture for Cooperative Heterogeneous On-line Systems). Unlike ARCHON though, the predefined portion of each agent (i.e., the white box) does not have to maintain a model for the designer defined portion (i.e., the black box) or any other agent it communicates with.

By now it may be apparent to the reader that the kind of agents we are characterizing in this paper, having taken a bottom-up view of multi-agent technology, can be quite fine grained. Unlike the AI sense of multi-agency, AAOSA agents are not centralized human-like agents with potentially conflicting intentions working together. Rather they are distributed software-object-like agents designed to work together cooperatively to implement complex applications.

In this paper, we will introduce the AAOSA architecture and some of its applications. An AAOSA system is actually parsing input in its interpretation phase. By examining the capabilities of an AAOSA parser, we will be able to give concrete evidence of the power of the AAOSA methodology. We will show that the AAOSA based parser can parse context-sensitive grammars with reasonable complexity. The main application of AAOSA has so far been in natural language user interfaces. We will discuss the differences between natural language processing and grammatical processing of languages and discuss the application of a more robust design for natural language user interfaces. The paper ends with an outline of what has been done and what lies ahead in this area.

2. AAOSA Agents and Coordination

Processing ofthe input is done in two main phases: an interpretation phase, in which the agent, or agents responsible for actuating an input are located, and a delegation phase in which the processes that have been located are called.

Each AAOSA agent must be able to interpret input sent to it as the content field of messages from other agents if so requested in the performative field of that message (Table 1). The result of this interpretation may cause the agent to claim that input as its own and/or to declare certain other agent/s responsible for processing it. Agents may consult other agents in order to complete their claims. These latter agents we will call down-chain agents relative to the requesting agent. This is a relative term and depending on the direction of the flow of requests, an agent may be down-chain (receiving) or up-chain (requesting) with respect to another agent.

TABLE 1

AAOSA Standard Inter-agent Message Fields.

Unique Query ID
Sender Agent
Message content (input to AAOSA Agent)
Performative
Priority or sender agent's hyperstructure degree
Claim made by agent about the content
Depth of search or allowable distance from initiator of query
Depth so far, or distance query has been propagated down-chain
History of agents that have processed this input before Agents that are first to receive input to the AAOSA system are called input agents. These agents initiate the interpretation phase for that input and are the entry points to the system, generating unique query IDs for new input. This does not mean that other agents do not query input agents. Cycles are prevented by preventing the agents from repeating processes already executed over the same query. Input agents are also responsible for announcing the end of the processing of a specific query to all down-chain agents.

Input may also have been generated inside the system and therefore any agent could potentially be an input agent. In the simplest form, a claim means all of input belongs to the agent making the claim. In many cases, as we shall see in the examples, a claim should contain other information as well (e.g., confidence in claim, name of claiming agent or symbol representing various claims one agent can make, the level of the claiming agent relative to the input agent of this query, parts of input that is being claimed).

The software designer is responsible for providing each agent with its interpretation policy. An interpretation policy is comprised of a set of rules used to decide to return a claim that a piece of the input belongs to that particular agent. The interpretation criterion may be the message content but is not limited to it. Process history, probabilities and outside information (e.g., interaction with other agents) are examples of some of the other parameters that may be used by the interpretation policy. Note that interpretations do not determine whether a particular input does not belong to the agent. Determining whether an input does not fall into the scope of responsibilities of an agent, as well as whether it does, amounts to modeling the world (W=P∪~P) and undermines the distributed nature of AAOSA agents. Therefore, the application of interpretation policies to input either result in a successful interpretation or a "don't-know" state.

The performer module in the white box actuates other modules in the agent based on the message performatives received from other agents. Each message includes a message content, and a performative that specifies what should be done with that content. No overall standard. data representation is needed for the message content. Agent specific data can be transferred in messages in whatever format the sender and receiver agree upon. The designer can add agent-specific performatives in sub-domains to facilitate special communications between agents. AAOSA provides a set of predefined general performatives by which the coordination of agents is managed (Table 2).

TABLE 2

Some AAOSA predefined inter-agent message performatives.

| | |
|---|---|
| Register | Agents make each other aware of their existence. |
| Advertise | An agent declares it can handle certain input. |
| Un-Advertise | An agent requests not to receive input from another agent. |
| This-Is-Yours | An agent announces another agent as responsible for handling certain input. |
| Is-This-Yours? | An agent that can not interpret a particular input requests interpretation from down-chain agents. |
| Restore | Agent requests another agent to backtrack to a state before processing took place on certain input. |
| Not-Mine | Down-chain agent has failed to interpret input sent down with an Is-This-Yours? Performative. |
| Maybe-Mine | Down-chain agent has encountered an ambiguity in interpreting input sent down with an Is-This-Yours? Performative. |
| It-Is-Mine | Down-chain agent has been successful in interpreting input sent down with an Is-This-Yours? Performative. |
| Commit | Agent requests immediate response, be it incomplete, to input sent down with an Is-This-Yours? Performative. |
| Learn | A new interpretation policy is suggested to an agent that will result in the sender agent being interpreted as responsible for certain input. |
| Un-Learn | An interpretation policy that results in the sender agent being interpreted as responsible for certain input is revoked. |
| Dissatisfied | Alternative process or interpretation is requested for input that has already been processed. |
| Forget-Problem | A previous request is canceled and the receiving agent will remove any temporary storage of interpretation results. |

In the interpretation phase, each agent, upon receiving input with an "Is-This-Yours?" performative, attempts to interpret the input by itself. If interpretation is successful, the agent will report claims using the "It-Is-Mine" performative. As we shall see, this does not always mean that this agent will be assigned to do its processing of the input.

On the other hand, if an agent can not interpret the input as its own, before reporting failure, it must check with other down-chain agents. If all down-chain agents report "Not-Mine", this agent will also report "Not-Mine" to its requesting agent. If at least one down-chain agent is able to interpret the input successfully and reports back with "It-Is-Mine", our agent will also report success. It follows that agents that have no down-chain agents to query may report "Not-Mine" upon failure to find an interpretation policy that applies to the contents of the query message they have received. To prevent agents from repeatedly processing the same queries in a cycle, each agent keeps track of queries it has processed and will reply "Not-Mine" to any query it has already responded to and has no new claims for.

After a path of down-chain links from a top-level agent to some agent or agents responsible for processing input is found (using the "Is-This-Yours?" performative), the delegation phase can start. In this phase, the "This-Is-Yours" performative is used to call agents on these paths to do the actual processing. Agents receiving a "This-Is-Yours" request may reinterpret the delegated input, or they may use pre-stored interpretation or down-chain query results to, in turn, process or delegate (or both) the input or parts of it.

Ambiguities of which agent owns a particular piece of input, and methods for resolving them, are central to the proper operation of AAOSA. Ambiguities occur when an agent that a job has been delegated to (i.e., has received a message with the This-Is-Yours performative) has not been able to interpret the message content as belonging to it based on it's interpretation policies, and Either more than one down-chain agent that was consulted with claim it, or, None of the agents consulted with claim it.

An ambiguity can be resolved by explicit interaction with another agent (e.g., an agent representing the human user). This is not always desirable or possible and therefore implicit resolution methods must be used. Table 3 describes methods that can be used to resolve ambiguities in AAOSA. The choice of ambiguity resolution methods and the way they are combined to achieve best results depend on the application in which they will be used.

TABLE 3

Ambiguity resolution methods.

| | | |
|---|---|---|
| Priorities | | Claims from agents representing higher degrees in the hyperstructure may have priority over the rest. |
| Context | Recency | Agent that has claimed input most recently is more likely to be responsible for processing disputed input. |
| | Status | Current status of a data-structure an agent is responsible for may make it more eligible for claiming disputed input. |
| Focus and Focal point | | Agents basing their claims upon a larger portion of the input (i.e., focus), or parts of the input closer to the requesting agent's focus (Focal Point) are more likely to be responsible for disputed input. Agents claiming mutually exclusive input may all be responsible at the same time. |
| Statistics and Probabilities | | More successful agents are chosen to process disputed input based on their prior performance history. |
| Interaction | | A dispute is settled by referring to another agent. |

Ambiguity and its resolution is particularly important in AAOSA because it provides a means by which agents can change their behavior (i.e., learn) and react to unexpected input.

As said before, an agent that does not have a suitable interpretation for input contents of a message sent to it with the "Is-This-Yours?" performative will propagate this message to it's down-chain agents. By suitable interpretation, we imply that in cases where the interpretation policy uses a small part of the whole input as its decision making focus, the agent may decide to query down-chain agents on the remainder of the input anyway, so as to make more accurate claims. In other words, agents complete their claims after receiving the results of their queries to their respective down-chain agents. Hence, there may even be cases in which an agent that has successfully interpreted parts of the input decides to query its own down-chain agents.

Even if this was not allowed, the problem of query propagation should be addressed by AAOSA: When do we decide to abandon a query or stop propagating it down-chain?

This depends very much on the application. In cases where the depth of propagation is not that much there may be no need for stopping it. In other cases, such as interactive applications, in which response time is important, time elapsed since first agent received input from user may be used to issue a message with the "Commit" performative. This performative will cause receiving agents to abandon any query response not received and act upon the information they have, be it incomplete. Another approach would be to time-stamp requests at origin so each agent can reject requests older than the allowable overall response time.

3. Designing AAOSA-based Applications

The AAOSA design methodology is essentially a bottom-up approach: The tasks necessary to achieve overall goals are identified and suitably decomposed. Then the data-flow between these tasks is determined. This way, pre-existing code can also be incorporated in the design as non-decomposable tasks by wrapping them into the black-box of AAOSA agents.

The break up of software into sub-domains is the responsibility of the designer who should also define the interpretation policies. This is done by looking at the system input from each agent's point of view. It is important not to over-generalize to avoid claiming input that really belongs to other agents. But there is no need to be too conservative either. Designers should keep in mind that interpretations are done in the context of the communication path by which the input has arrived to the agent and resolving ambiguities that arise as a result of overlapping interpretations are the responsibility of up-chain agents.

It is advisable that each agent be kept simple in its responsibilities and be limited in the decisions it needs to make to reap the benefits of distribution and to enhance its learning abilities. The overhead of the required units (the white box) should be taken into consideration.

Agents can be replaced at run-time with other more complete agents. The replacement can even be a hierarchy or network of new agents breaking down the responsibilities of their predecessor. This feature provides for the incremental design and evaluation of software.

In AAOSA, the emphasis is on the distribution of capabilities. Therefore if a capability is general enough to be coded into the White-box and distributed over all agents it is much more desirable than assigning a specific agent to be responsible for it (e.g., Using the learning module in the white-box rather than creating a separate learning meta-agent).

In the following example we shall see that the manner by which a system is agentified depends on the various objectives the designer has in mind.

3.1 The Seven-segment Example

Figure 3A:
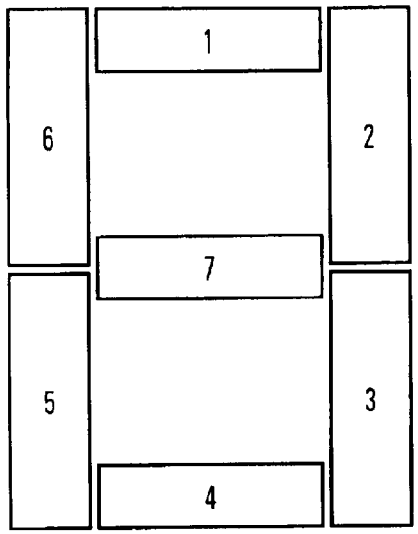
FIG. 3a illustrates a 7-segment display and a numbering of its segments.

Let us follow the design of a simple application to observe the various advantages AAOSA may bring. This discussion will center on FIGS. 3a–3d, sometimes collectively referred to herein as FIG. 3. The system to be designed takes a number between 0 and 9 and switches on the appropriate LEDs in a seven-segment display. FIG. 3a illustrates the display and the numbering of its segments. There are, of course, tried and tested algorithms for designing this system that give us optimal results. This is mainly because the problem is a limited one, and all possible input and desired output is known.

Figure 3B:
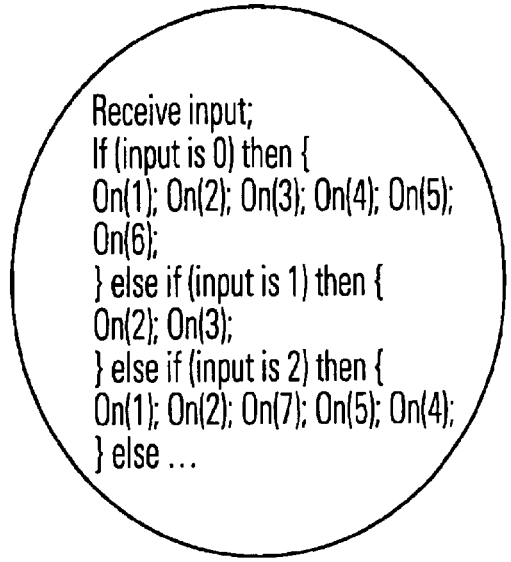
FIG. 3b illustrates a non-modular centralized solution for the 7-segment display example.

The first step in the design of this system would be to identify the range of possible input to the system and the set of output functions available. In this case, there are 10 possible inputs namely the numbers 0 to 9. There are 7 functions which should be used to produce the overall desired output: Switch LED 1 on (or On(1) for short), On(2), On(3) . . . On(7) on. FIG. 3b illustrates a non-modular centralized solution, which involves 48 functions and 5.5 condition checks on average assuming each number is inputted with equal probability ($\frac{1}{10}$).

Figure 3C:
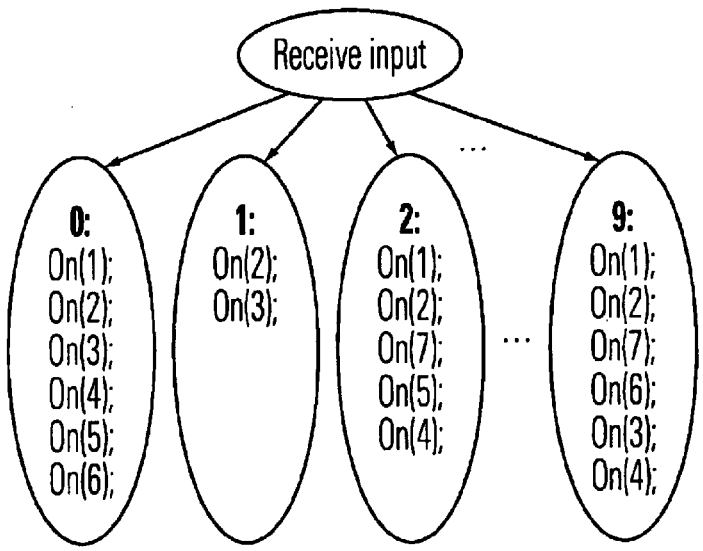
FIGS. 3c and 3d illustrate alternative agent networks implementing the 7-segment display function.
Figure 4:
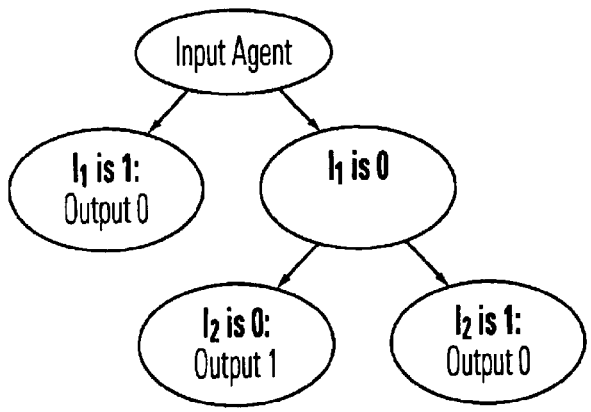
FIG. 4 illustrates an agent network implementing the logical NOR function.

An alternative to this approach would be to have an agent represent each function and an input agent to receive the input and distribute it. Such an agent network is illustrated in FIG. 3c. If the input-agent were to have any interpretations of its own, they would be of the transitive kind, declaring an input to belong to one of the down-chain agents. However, in this example, transitive interpretations are not necessary because the fact that input has been handed down through the Input-agent does not affect the route or process it may be taking later. It is always preferable not to use transitive interpretations as this prevents the agents from being self-sufficient. To prove that there exists an AAOSA hyperstructure with no transitive interpretations for anycomputable function, FIG. 4 illustrates the logical NOR function using AAOSA. The input agent receives $I_1I_2$ as input, and processes it in the manner described herein. Therefore, in the case of the hyperstructure in FIG. 3c, each agent has its own interpretation policy, namely checking its input against the number it represents.

Although the number of functions in this system is the same as the centralized one in FIG. 3b, certain useful features have come about because of the waywe have modularized. Each agent is reusable in other systems, and, in the case of using a parallel platform, the number of conditions that may be checked on average would be much less (in a fully parallel system it would be 1 condition on average).

Figure 3D:
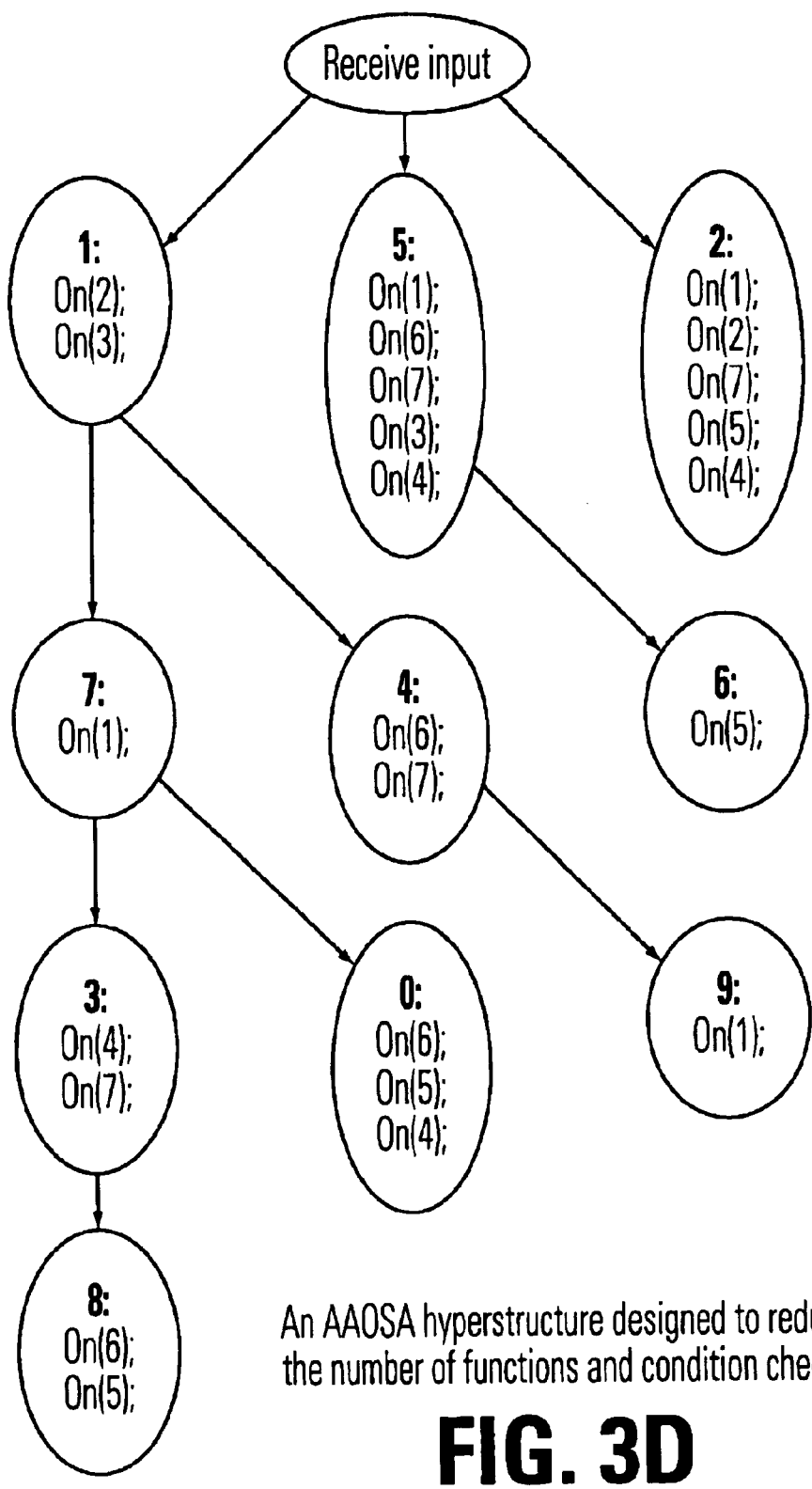

As we stated before, a system can be modeled using many different hyperstructures and the choice of the hyperstructure to be used depends on the requirements of the application. FIG. 3d illustrates a different network hyperstructure for implementing the 7-segment display function. This network is modularized based on the optimization of the number of functions, while maintaining a relatively low number of average condition checks. The total number of functions implemented here is 24 (half that of the FIGS. 3b and 3c designs). The average condition check, if the system is taken as a running on a fully parallel platform, can be calculated as follows.

Each possible input between 0 to 9 would occur $\frac{1}{10}$ of the time,

If input were 1, 2, or 3, we would be checking 1 condition,

For inputs 4, 6 and 7, 2 conditions would have been checked,

For inputs 0, 3 and 9, the number of conditions checked would be 3, and

For input 8, 4 conditions would have to be checked.

Thus, the average conditions checked would be 2.2. Of course, in calculating this number we disregarded the conditions checked in the white-box of the agents during the query and delegation phase. However in general, unlike this example, the complexity of the interpretation process for each agent usually outweighs the complexity of the processes involved in these two phases. In comparison to the hyperstructure in FIG. 3c, we have reduced the reusability and increased the average number of condition checks, in order to minimize the number of functions.

3.2 Learning in AAOSA

The combination of machine learning and multi-agent systems can have benefits for both. Multi-agent systems having learning capabilities can reduce cost, time, and resources and increase quality in a number of ways:

Ease of programming

Ease of maintenance

Widened scope of application

Efficiency

Coordination of activity

On the other hand, machine learning in a multi-agent setup becomes faster and more robust. Learning can improve performance in AAOSA software by improving speed and accuracy, reducing interactions, providing generalizations, and helping the system to tune in to different user preferences.

Learning can be applied to AAOSA in a number of ways depending on the objectives and application of the software. For example, in large and complex software, distributing the learning over a hyperstructure of more simple sub-domains is less complex than centralized learning. Learning can be used to improve the agent's own specialized performance and also to improve its interpretation policy to reduce ambiguities. This latter form of learning is driven by the ambiguities themselves. There are various machine learning algorithms that can be used in the learning module of the white box, sometimes in combination. For instance, Reinforcement Learning can be used to fine tune the choice of relevant interpretation rules, while rule learning algorithms add or update them. The former is more gradual and statistics-based while the latter changes the agent behavior in quantum leaps and is based on a comparison of the actual interpretation with the desired one.

Learning should guarantee that the balance of distribution and learning methods should not impede each other. For instance when a new interpretation rule is learned by a down-chain agent, "A", it may have to send Un-Learn messages to all up-chain agents requesting them to remove any identical rule that results in delegation of input to agent "A".

Learning can be deployed to automate disambiguation, and/or resolve conflicts between interpretation rules in a single agent. The latter case occurs when a single agent has rules that may result in conflicting interpretations based on similar decision criteria. In these cases, weighting the rules based on past experience is a form of learning.

In one embodiment, the learning algorithm is a very simple rote-learning algorithm that records interpretation results for ambiguities explicitly disambiguated for the agent by the user. As we shall see in the next section, this learning algorithm is sufficient in the interactive natural language interface application. In other cases where implicit statistical (history-based) disambiguation is used more often, the learning algorithm can also be more complex. In these cases reinforcement learning methods could be used.

4. An AAOSA Parser

The examples of the previous section are relatively simple because:

All possible input is known and manageable at design time,

Only one agent is delegated to at each one time, and

No ambiguities can occur because the interpretation policies of each agent are mutually exclusive over the input.

We will now discuss examples in which some or all of the conditions above are not met.

AAOSA can be used to parse input given in the form of strings of characters. We will show that the AAOSA parser can parse any context-sensitive grammar and we will discuss the time-complexity of this parser. A parser only interprets input and so an interpretation phase similar to that discussed in section 2 is enough. We will also not need any learning therefore a subset of the performatives in the previous section are needed here. The AAOSA parser is of importance to us because it shows the power of the interpretation phase of the AAOSA methodology.

In a parser, input is not predictable at the time of design and so each agent will have to consider parts of the whole input when interpreting it. Therefore, the claims made by different agents will have to include the portions of the input being claimed. In order to do so, we introduce the concept of foci. We denote a focus F by $(f, I_s)$ where $f$, the focus set, is a set of tuples, $[s_i \ldots e_i]$, each holding index information about part of the string $I_s$. We will define the functions string(F) and focus-set(F) as functions that return $f$ and $I_s$, respectively, for a given F.

For instance the focus ($\{[0 \ldots 3]\}$, "Babak") is pointing to the first four characters: "Baba" and the focus ($\{[0 \ldots 2], [4 \ldots 4]\}$, "Babak") is pointing to the first three, "Bab", and the last one, "k". We will refer to each member of $f$ with $f[i]$, where i is the index of the members and $0 \leq i < NOMB(f)$. NOMB is a function returning the number of members $f$ has. The functions $s(f[i])$ and $e(f[i])$ return $s_i$ and $e_i$ respectively. No two members of $f$ can be overlapping:

$$\forall i, 0 \leq i < NOMB(f), \neg \exists j, 0 \leq j < NOMB(f),$$

$$s(f[i]) \leq s(f[j]) \leq e(f[i]) V$$

$$s(f[i]) \leq e(f[i]) \leq e(f[i])$$

and all members in $f$ are kept sorted in ascending order:

$$\forall i, (0 < i < NOMB(f)-1), s(f[i-1]) \leq s(f[i]) \leq s(f[i+1]).$$

If members $f[i]$, and $f[i+1] \in f$ have the following property:

$$e(f[i])=s(f[i+1])-1$$

then we can merge the two members into one and remove the other by making the following change:

$$e(f[i]) \leftarrow s(f[i+1])$$

$$NOMB(f) \leftarrow NOMB(f)-1$$

$$f[x] \leftarrow f[x+1] \text{ for } i < x < NOMB(f)$$

So for instance the focus ($\{[0 \ldots 2][3 \ldots 7]\}$, $I_s$) is the same as the focus ($\{[0 \ldots 7]\}$, $I_s$) for any $I_s$. In the remainder of the discussions in this section all foci only have one member and we will omit the indexing for the sake of simplicity (i.e., we will take $f$ to mean $f[0]$).

If $f_1$ and $f_2$ are the focus sets for foci $F_1$ and $F_2$ respectively, we say $F_1$ is the predecessor of $F_2$ ($F_1 << F_2$) if:

$$F_1 << F_2 \Leftrightarrow e(f_1[NOMB(f_1)-1]) = s(f_2[0]) - 1; \quad (1)$$

As discussed in the preceding sections, an agent that has successfully interpreted a particular input ($I_s$) will be sending one or more claims to the agent immediately up-chain that originally sent this input in the form of a query. These claims are either generated by this agent, or have been received from down-chain agents and are being propagated by this agent. A claim (C) is a tuple (F, SYMB) where F is the focus and SYMB is a symbol representing the claim. The functions focus(C) is defined to return the focus F of claim C and the function symbol(C) is defined to return the symbol SYMB of claim C.

A sequence is a list of claims $<C_n, \ldots, C_m>$ ($m \geq n$) such that:

$$(m>n) \rightarrow \forall i | (n \leq i < m)^\smallfrown (focus(C_i) << focus(C_{i+1})) \quad (2)$$

A $<C_n, \ldots, C_m>$ ($m \geq n$) is a full sequence if:

$$(s(focus\text{-}set(focus(C_n)))=0)^\smallfrown(e(focus\text{-}set(focus(C_m)))=length(I_s)-1)$$

where length($I_s$) is the length of the input string (i.e., the character count). We must note here that all claims C made by an AAOSA agent string(focus(C)) is the same and in the case of the AAOSA parser it is always equal to $I_s$ therefore we will omit the string portion of the foci in the examples given from here on.

The sequence string for a sequence $<C_n, \ldots, C_m>$ is:

symbol($C_n$). symbol($C_{n+1}$) . . . symbol($C_m$)

Let us now consider languages represented by grammars. A language is any set of sentences over an alphabet. A sentence is any string of finite length composed of symbols from the alphabet and the alphabet itself is any finite set of symbols. One way to represent a language is to give an algorithm that determines if a sentence is in a language or not. A more general way is to give a procedure which halts with the answer "yes" for sentences in the language and either does not terminate or else halts with the answer "no" for sentences not in the language. There are languages we can recognize by a procedure, but not by an algorithm.

A grammar is a class of generating systems originally formalized by linguists in their study of natural languages. We denote a grammar G by ($V_N$, $V_T$, P, S). The symbols $V_N$, $V_T$, P, and S are, respectively, the variables, from which strings of words could be derived, terminals, which play the role of words, productions, which show the relations that exist between various strings of variables and terminals, and the start symbol which is a variable that generates exactly those strings of terminals that are deemed in the language. We denote the language generated by G with L(G). A string is in L(G) if:

The string consists solely of terminals, and,

The string can be derived from S.

A sentential form is a string of symbols from $V_N \uparrow V_T$. A sentential form $\chi\beta\phi$ is derived from the sentential form $\chi\alpha\phi$ if there is a grammar rule $\alpha \rightarrow \beta$, and we write $\chi\alpha\phi \rightarrow \chi\beta\phi$. A derivation sequence from the sentential form $\eta$ to the sentential form $\kappa$ is a sequence $\eta_1 \ldots, \eta_n$ of sentential forms such that $\eta = \eta_1 \rightarrow \ldots \rightarrow \eta_n = \kappa$; then we write $\eta \rightarrow^* \kappa$. In the above notation $\alpha$ and $\beta$ are said to be the left-hand side and the right-hand side of the production rule $\alpha \rightarrow \beta$ respectively. $\alpha$ consists of a single sentential form. $\beta$ may consist of a number of possible sentential forms $\beta_i$ (usually separated by "|"). $\epsilon$ is an empty sentence or a sentence consisting of no symbols. We will also define the following:

$$V = V_N \cup V_T$$

$\tau$: The number of elements of V.

$V^*$: The set of all sentences composed of symbols of V.

$V^+ = V^* - \{\epsilon\}$

A context-free grammar is a grammar G=($V_N$, $V_T$, P, S) in which for every production $\alpha \rightarrow \beta$ in P, $\alpha$ is a single variable, and $\beta$ is any string other than $\epsilon$ (null or empty string). So a production of the form $A \rightarrow \beta$ allows the variable A to be replaced by the string $\beta$ independent of the context in which A appears.

Example 1. Consider the context-free grammar G=({S, A}, {a, b}, P, S), where P consists of:

S→AB

A→aAb|ab

B→cBd|cd

The string aabbccdd does belong to the language this grammar represents because:

S→AB→aAbcBd→aabbcBd→aabbccdd 4.1 The Algorithm

To parse a language using AAOSA, we first need to build a hyperstructure based on the grammar to be parsed:

I. We create an AAOSA agent for each production rule. We are assuming that each production rule in the grammar has a unique left-hand side. We will denote the production rule represented by agent A with $R_A$.

II. Agent B should be down-chain with respect to agent A, if in the right-hand side of $R_A$, there is a reference to a variable that exists in the left-hand side of $R_B$.

III. The agent representing S is the input-agent to this hyperstructure.

IV. The right-hand side of the production rule an agent is representing is that agent's interpretation policy.

Figure 5:
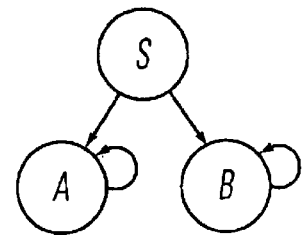
FIG. 5 illustrates an agent network hyperstructure for parsing the grammar of example 1.

As an example, the hyperstructure for parsing the grammar of example 1 is shown in FIG. 5.

In an agent new claims can only be made based on existing claims $C_n, \ldots, C_m$, ($m \geq n$) if $C_n, \ldots, C_m$ constitute a sequence, and the symbol-string for $C_n, \ldots, C_m$ match one of the possible reductions on the right-hand side of the production rule that A represents (interpretation policies). We can formalize this condition as follows:

$$\exists C_n, \ldots, C_m \exists \beta_i \in R_A | (m \geq n)^\smallfrown symbol(C_n).symbol(C_{n+1}) \ldots symbol(C_m) = \beta_i^\smallfrown C_n << C_{n+1} << \ldots << C_m \quad (3)$$

In this case, the symbols on the left-hand side of $R_A$ are the symbols of the possible claims. These claims themselves constitute a sequence. Note that not all these claims are necessaly new and there is no need to repeat claims as each agent stores the claims it has so far received or made.

All computable foci for new claims should be computed using the following clues:

New claims, $C_a, \ldots, C_b$ ($a \geq b$), made based on $C_n, \ldots, C_m$ ($m \geq n$), will have the following feature:

focus($C_a$)∪focus($C_{a+1}$)∪ . . . ∪focus($C_b$)=focus($C_n$) ∪focus($C_{n+1}$)∪ . . . ∪focus($C_m$).

Therefore, we always know that s(focus($C_a$))=s(focus($C_n$)), and, e(focus($C_b$))=e(focus($C_m$)).

Also:

(b−a=m−n)→∀i|(0≤i≤b−a)^(focus($C_{i+a}$)=focus($C_{j+n}$)) (a≤i≤b)^(symbol($C_i$)∈$V_T$)→focus($C_i$) is known and it follows that:

$$(a \leq i < b)^\smallfrown(symbol(C_i) \in V_T) \rightarrow s(focus(C_{i+1})) = e(focus(C_i))$$

$$(a < i \leq b)^\smallfrown(symbol(C_i) \in V_T) \rightarrow e(focus(C_{i-1})) = s(focus(C_i))$$

It can be seen that there are cases in which not all the foci of the claims produced can be computed. We shall see that this has no effect on the soundness of our algorithm.

Input to the system ($I_s$) is a string of terminals. The input is represented using a set of claims ($H_0$) and the length of the input (length($I_s$)). For example, the string aabbccdd would be represented as follows:

$H_0$={(a, ({[0 ... 0]}, $I_s$)) (a, ({[1 ... 1]}, $I_s$)) (b, ({[2 ... 2]}, $I_s$)) (b, ({[3 ... 3]}, $I_s$)) (c, ({[4 ... 4]}, $I_s$)) (c, ({[5 ... 5]}, $I_s$)) (d, ({[6 ... 6]}, $I_s$)) (d, ({[7 ... 7]}, $I_s$))} and length($I_s$)=8

Each agent keeps a list of claims it has made so far. New claims in response to a certain query are sent up-chain when they are made, unless a message is received requesting a stop to the processing of that query (i.e., a message initiated by the input with the perfonnative Forget_Problem when parsing has ended). Agents receiving a query respond with the new claims they have made that have not been sent as a response to this query before. Agents complete their response to queries as new claims are made or received. Agents may have to query immediate down-chain agents to complete their claims. Thus, with the hyperstructure being designed according to II, if a claim is made in a down-chain agent that is useful to any other agent X up-chain, X will eventually receive it. An algorithm implementing this process is as follows:

1 The agent representing the start symbol (Agent S or the input agent for the parser) makes any claims it can based on $H_0$. The algorithm for agent S is as follows:

```
1.1    Convert input into claims,
1.2    Make all possible new claims based on existing claims by
       applying condition (3)
1.3    if ∃ C | C = (S, ({[0 ... length(I_s) – 1]}, I_s)) then
       1.3.1  Conclude I_s ∈ L(G)
       1.3.2  End parse.
1.4    Depth of search ← 0
1.5    Depth so far ← 0
1.6    if any down-chain agent exists then
       1.6.1  Query all down chain agents
       else
1.7    Conclude I_s ∉ L(G)
1.8    End parse.
```

2 Agent S, upon receiving responses to its query, will:

```
2.1  Make all possible new claims based on existing claims by
     applying condition (3)
2.2  if new claims have been made then
     2.2.1  new claims ← true
     2.2.2  if Depth of search > Depth so far then
            2.2.2.1 go to 2.1
2.3  if ∃ C | C = (S, ({[0 ... length(I_s) – 1]}, I_s)) then
     2.3.1  Send Forget_Problem message to all down-chain agents
     2.3.2  Conclude I_s ∈ L(G)
     2.3.3  End parse.
     else
2.4  if (new claim = false) and (All agents have been visited) then
     2.4.1  Send Forget_Problem message to all down-chain agents
     2.4.2  Conclude I_s ∉ L(G)
     2.4.3  End parse.
     else
2.5  if all down-chain agents have responded to query with the
     current depth of search then
     2.5.1  New claim ← false
     2.5.2  Depth of search ← Depth of search + 1
     2.5.3  Depth so far ← 0
     2.5.4  Query all down chain agents again.
```

3 Each agent, upon being queried, will:

```
3.1  Depth so far ← Depth so far + 1
3.2  if Depth so far < Depth of search then
     3.2.1  Make all possible new claims based on existing claims
            by applying condition (3)
     3.2.2  if new claims have been made then
            3.2.2.1  new claim ← true
            3.2.2.2  go to 3.1
     3.2.3  if ∃ C | C is a new claim not sent to querying up-chain
            agents then
            3.2.3.1  Send It-Is-Mine message containing C to
                     all querying up-chain agents
     3.2.4  Query all down chain agents
     else
3.3  Send Not-Mine to querying up-chain agents
```

4 Each agent upon receiving responses to its query, will:

```
4.1  Make all possible new claims based on existing claims by
     applying condition (3)
     4.1.1  if new claims have been made then
     4.1.2  go to 4.1
4.2  if ∃ C | C is a new claim not sent to querying up-chain agents
     then
     4.2.1  Send It-Is-Mine message containing C to all querying
            up-chain agents
```

An input string $I_s$ belongs to L(G), where G is the grammar represented by an AAOSA hyperstructure, if the following claim is made:

(S, ({[0 ... length($I_s$)–1]}, $I_s$))

An input $I_s$ does not belong to L(G), where G is the grammar represented by an AAOSA hyperstructure, if all agents have been visited and no new claims have been made during a cycle in S. For a given agent, a cycle is the time between querying down-chain agents and receiving all responses from them. In the algorithm, when all agents have been visited at least once, we are guaranteed a cycle between each incrementation of the Depth of search. This end condition is correct because only agents make new claims and the claims made are based upon previously made claims. If in one cycle, no new claims were made by all the agents, no new claims would be possible in the succeeding cycles either.

Note that this condition forces the input agent to be, at least, aware of the number of agents in the hyperstructure. Another, possibly less efficient, approach would be to set the end condition in step 2.4 of the algorithm to be as follows:

$$\text{Depth of search} > (\tau+1)^{length(Is)+1}$$

We shall see, in the next section, why using this end condition is correct.

FIG. 5 shows the AAOSA hyperstructure for example 1. Note that agents may be down-chain with respect to themselves. There is no need, in this case, for agents to query themselves and they may simply reapply their interpretation policies on the claims they have made so far every time they make a new claim. Let us see how this system can parse the input aabbccdd to see if it belongs to the language represented by the grammar in example 1:

1) Agent S receives input. No new claims apart from the input claims can be made by S at this point, 2) Agent S queries agents A and B (Is-This-Yours?), 3) Agent A makes the following claims and sends them up to agent S:
   (A, {[1 . . . 2]}) (A, {[0 . . . 3]})
4) Agent S cannot make any new claims based on Agent A's response,
5) Agent B makes the following claims and sends them up to agent S:
   (B, {[5 . . . 6]}) (B, {[4 . . . 7]})
6) Agent S is able to make the following new claim (S, [0 . . . 7]) and we conclude that aabbccdd is valid in this language:

Note that the order of the sending and receipt of queries and responses does not have any effect on the overall outcome.

The grammar in example 1 is that of a context-free grammar. A less restricted form of grammar is the context-sensitive grammar. In this grammar for every production $\alpha \rightarrow \beta$ in P, we may have $|\beta| \geq |\alpha|$ (we use $|x|$ to stand the number of symbols in the string x).

Example 2. The following grammar is context-sensitive:
S→aSBC|aBC
CB→BC
aB→ab
bB→bb
bC→bc
cC→cc The language L(G) contains the word $a^n b^n c^n$ for each $n \geq 1$.

Figure 7:
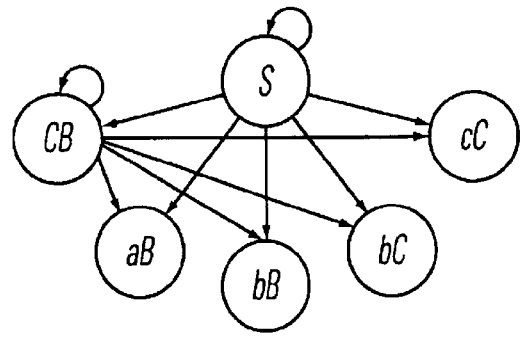
FIG. 7 illustrates an AAOSA hyperstructure for parsing a grammar.

FIG. 7 illustrates an AAOSA hyperstructure for this grammar. Let us see how this system can parse the input aabbcc to see if it belongs to the language represented by the grammar in example 1:

1) Agent S queries all at Depth of Search 1,
2) Agent "aB" makes claim ({[2 . . . 2]}, B) in reply to agent S's query,
3) Agent "bB" makes claim ({[3 . . . 3]}, B) in reply to agent S's query,
4) Agent "bC" makes claim ({[4 . . . 4]}, C) in reply to agent S's query,
5) Agent "cC" makes claim ({[5 . . . 5]}, C) in reply to agent S's query,
6) (S cannot make any new claims and increments Depth of search to 2)
7) Agent "CB" receives first responses from down-chains and claims ({[3 . . . 3]}, C) and ({[4 . . . 4]}, B),
8) S, having received this latest claim from "CB" can claim ({[1 . . . 3]}, S) based on ({[1 . . . 1]}, a), ({[2 . . . 2]}, B), and ({[3 . . . 3]}, C),
9) The checking loop for S will not break because the resulting claim from step 8 makes the agent be able to make a new claim, namely ({[0 . . . 5], S) based on ({[0 . . . 0]}, a), ({[1 . . . 3]}, S), ({[4 . . . 4]}, B), and ({[5 . . . 5]}, C). The parsing thus ends successfully at a depth of 2.

4.2 The Proof

In order to prove the soundness and correctness of our algorithm we will prove, first, that if an input string does belong to the grammar of any. language, it will indeed be claimed by the AAOSA parser representing that grammar. Then, we will prove that for context sensitive grammars the AAOSA parser can also determine, in finite time, whether a given input string does not belong to the represented language.

Lemma. In the AAOSA parser described above, all the symbol strings $Q_1 Q_2 \ldots Q_{nq}$ for full sequences $q = <q_1, q_2, \ldots, q_{nq}>$ are sentential forms from which the input string $I_s = A_1 A_2 \ldots A_n$ can be derived with grammar G. To put it formally:

$$\forall q_1, q_2, \ldots, q_{nq} | s(\text{focus}(q_1)) = 0 \char`\^ e(\text{focus}(q_{nq})) = \text{length}(I_s) - 1 \char`\^ q_1 << q_2 << q_3 << \ldots << q_{nq}$$

$$\rightarrow \text{symbol}(q_1).\text{symbol}(q_2).\text{symbol}(q_3) \ldots \text{symbol}(q_{nq}) \rightarrow^* A_1 A_2 \ldots A_n$$

Proof of lemma. We first prove that the theorem holds if the claims made are only input claims ($H_0$). Then, we show that the addition of a claim, which is done under the condition (3), preserves the above conjecture as well.

Case 1: The only claims made are $H_0$. In this case there is only one full sequence. The symbol string of this full sequence is none other than the input string $A_1 A_2 \ldots A_n$ itself, and obviously $A_1 A_2 \ldots A_n$ is a valid derivation for itself.

Case 2: We will assume that an agent is in a state in which all full sequences consisting of claims it has made so far are intermediate derivations for the input string. We will prove that the introduction of a new claim-sequence, according to condition (3) above, introduces new full sequences that are also intermediate derivations for the input string. To put it formally, if we denote the g claims made so far with Xi ($0 \leq i \leq g$), our inductive hypothesis is:

$$\forall X_i (0 \leq i \leq g) \exists X_a X_b \ldots X_x | s(\text{focus}(X_a)) = 0 \char`\^ e(\text{focus}(X_x)) = \text{length}(I_s) - 1 \char`\^ X_a << X_b << \ldots X_i << \ldots << X_x$$

$$\char`\^ \text{symbol}(X_a).\text{symbol}(X_b) \ldots \text{symbol}(X_i) \ldots \text{symbol}(X_x) \rightarrow^* A_1 A_2 \ldots A_n$$

If now an agent makes the new claim-sequence $c = <C_1, \ldots, C_k>$ from the sequence $<X_1, \ldots, X_m>$ using condition (3). The condition holds that:

$$(m > 1) \rightarrow \forall i | (1 \leq i < m) \char`\^ (\text{focus}(X_i) << \text{focus}(X_{i+1}))$$

Each new full sequence $q = <q_1, \ldots q_x>$ that is introduced by c contains at least one of $C_1, \ldots, C_k$. We will first show that q contains all claims $C_1, \ldots, C_k$.

q is a full sequence, therefore
$s(\text{focus}(q_1)) = 0$.
c is a sequence so $$s(\text{focus}(C_1)) < s(\text{focus}(C_2)) < \ldots < s(\text{focus}(C_k)) \qquad (4)$$

Thus a full sequence that contains a claim $C_i$ for $1 < i \leq k$, must also contain a claim w such that:
$w << C_i$ One possible appropriate claim that satisfies this condition is $C_{i-1}$. Applying this result iteratively, and extending the result to $C_i$, we come to the conclusion that a full sequence containing a claim $C_i$ for $1 < i \leq k$, also contains all other claims $C_j$ for $1 \leq j < i$.

From equation (4) we can also see that a full sequence that contains a claim $C_i$ for $1 \leq i < k$, must also contain a claim w such that:
$C_i << w$ One possible appropriate claim that satisfies this condition is $C_{i+1}$. Applying this result iteratively, and extending the result to $C_k$, we conclude that a full sequence containing a claim $C_i$ for $1 \leq i < k$, also contains all other claims $C_j$ for $i < j \leq k$.

Thus, we have proven that a full sequence, which contains one claim from the new claim-sequence c, contains all the claims in c. Full sequences that contain all the claims in c are of the form:

$$s = <y_1, \ldots, y_a, C_1, \ldots, C_k, y_{a+1}, \ldots, y_b> \qquad (5)$$

Some special cases in the above model are when a=0, when $C_1$ is the first claim in the full sequence, when b=a, when $C_k$ is the last claim in the full sequence, and when a=b=0, when the full sequence consists solely of the claims in c.

Based on the definition of a sequence we have $y_a \ll C_1$, which means:

$$s(\text{focus}(C_1))=e(\text{focus}(y_a))+1$$

We also had:

$$s(\text{focus}(C_1))=s(\text{focus}(X_1))$$

So $y_1, \ldots, y_a$ are all possible sequences that start full sequences $<y_1, \ldots, y_a, X_1, \ldots>$.

Further more, again based on the definition of a sequence we have $C_k \ll y_{a+1}$, which means:

$$e(\text{focus}(C_k))=s(\text{focus}(y_{a+1}))-1$$

We also had:

$$e(\text{focus}(C_k))=e(\text{focus}(X_m))$$

So $y_1, \ldots, y_a$ are all possible sequences that end full sequences $<\ldots, X_m, y_{a+1}, \ldots, y_b>$.

Since $<X_1, \ldots, X_m>$ is a sequence, we have demonstrated that the new full sequences $<y_1, \ldots, y_a, C_1, \ldots, C_k, y_{a+1}, \ldots, y_b>$ contain claims $y_i$ such that $<y_1, \ldots, y_a, X_1, \ldots, X_m, y_{a+1}, \ldots, y_b>$ are also full sequences.

From our inductive hypothesis the symbols of the full sequence $<y_1, \ldots, y_a, X_1, \ldots, X_m, y_{a+1}, \ldots, y_b>$ which are symbol($y_1$) ... symbol(ya) symbol($X_1$) ... symbol($X_m$) symbol($y_{a+1}$) ... symbol($y_b$) are an intermediate derivation for the input string. This means that there are sentential forms $\gamma_1, \gamma_2, \ldots, \gamma_d$, such that: symbol($y_1$) ... symbol($y_a$) symbol($X_1$) ... symbol($X_m$) symbol($y_{a+1}$) ... symbol($y_b$) $\rightarrow \gamma_1 \rightarrow \ldots \rightarrow \gamma_d \rightarrow A_1 A_2 \ldots A_n$ The new claim-sequence c was allowed to be made because there is a grammar rule:

symbol($C_1$) ... symbol($C_k$)→symbol($X_1$) ... symbol($X_m$)∈R, so symbol($y_1$) ... symbol(ya) symbol($C_1$) ... symbol($C_k$) symbol($y_{a+1}$) ... symbol($y_b$)→ symbol($y_1$) ... symbol(ya) symbol($X_1$) ... symbol($X_m$) symbol($y_{a+1}$) ... symbol($y_b$)→

$\gamma_1 \rightarrow \ldots \rightarrow \gamma_d \rightarrow A_1 A_2 \ldots A_n$, (6)

In other words, the new full sequence also represents an intermediate derivation for the input string.

Theorem 1. If the S agent makes a claim for which the new full sequence consists solely of a claim with the symbol S and the focus $\{[0 \ldots \text{length}(I_s)-1]\}$, then the AAOSA parserhas achieved acomplete parse for the input string $A_1 A_2 \ldots A_n$.

Proof of theorem 1. In equation (5) a=b=0 and k=1 and symbol($C_1$)=S. Using equation (6) we conclude:

$$S \rightarrow^* A_1 A_2 \ldots A_n$$

In step 2.4 of the above algorithm we are checking to find out if there has been any new claims from propagating queries to a depth more than $(\tau+1)^{\text{length}(Is)+1}$.

Theorem 2. In an AAOSA parser representing a context-sensitive grammar G=($V_N$, $V_T$, P, S), no new claims can be made at a Depth of search greater than $(\tau+1)^{\text{length}(Is)+1}$.

In other words, in an AAOSA parser representing a context-sensitive grammar G=($V_N$, $V_T$, P, S), all possible claims are made before the depth of search becomes greater than $(\tau+1)^{\text{length}(Is)+1}$.

Proof of theorem 2. Any context-sensitive grammar is recursive. This means that there exists a procedure to derive the input string from the start symbol that is guaranteed to halt. We assume that P does not contain S→ϵ and let $I_s \in V_T^+$. We define the set $T_m$ as the set of strings $\alpha \in V^+$, of length at most length($I_s$), such that S→*α by a derivation of at most m steps.

According to the definition of context-sensitive grammars, we have:

$$T_m = T_{m-1} \cup \{\alpha | \exists \beta \in T_{m-1} \hat{} \beta \rightarrow \alpha \hat{} |\alpha| \leq \text{length}(I_s)\}$$

Also:

$$S \rightarrow^* \alpha \hat{} |\alpha| \leq \text{length}(I_s) \rightarrow \exists m | \alpha \in T_m$$

We have:

$$\forall m \geq 1, T_m \supseteq T_{m-1}$$

Therefore:

$$T_m = T_{m-1} \rightarrow T_m = T_{m+1} = T_{m+2} = \ldots$$

The AAOSA hyperstructure is actually calculating $T_1, T_2, T_3, \ldots T_k$ where k is the depth of search and the symbol string for each new full sequence consisting of at least one of the new claims made at a depth of search equal to i($0 \leq i \leq k$) belongs to $T_i$. The number of strings in $V^+$ of length less than or equal to length($I_s$) is:

$$\tau + \tau^2 + \tau^3 + \ldots + \tau^n \leq (\tau+1)^{\text{length}(Is)+1}$$

These are the only strings that may be in $T_i$. Thus $$\exists m \leq (\tau+1)^{\text{length}(Is)+1} | T_m = T_{m-1}$$

This means that no new claims can be made from this point on. Thus, our procedure is guaranteed to halt (i.e., it is an algorithm).

4.3 The Complexity of the AAOSA Parser

According to the parsing algorithm above and condition (3), the complexity of making claims is of O(n) where n is the length of the input. Making claims takes place every time agent increments depth of search therefore, assuming agents running in parallel, the system will have an average complexity of:

$$O(n+2n+3n+ \ldots +kn)=O(nk^2)$$

where k is the depth of search. In the worst case, execution stops when k=$(\tau+1)^{n+1}$, where $\tau$ is the number of elements of V. Therefore the complexity of this algorithm is less than or equal to:

$$O(n(\tau+1)^{2(n+1)})=O(n\tau^{2n})$$

We shall see that by using multiple processors for each agent we can reduce this complexity to:

$$O(\tau^{2n})$$

4.3.1 Complexity of the Algorithm for Context-free Grammars

In AAOSA parsers representing context-free grammars, each agent represents a non-terminal symbol. The end condition of our algorithm is true when all agents receive all possible results from all their respective down-chain agents. Let us consider two cases:

Case 1: Agent B is indirectly down-chain to agent A and agent A can only make new claims once new claims from B have arrived. The time agent A would be waiting for the response from B is at the worst case proportional to the number of agents which in this case is equal to the number of non-terminal symbols m.

Case 2: Agent A can make new claims based on the claims it has made. Note that in this case too the Depth so far is incremented (Algorithm line 3.2.2.2). The number of consecutive times A spends in this loop in the worst case is less than length($I_s$) or n.

From these two cases it follows that if m is the number of non-terminal symbols in V and n is the length of the input, the worst case depth of search would be O(m+n). By replacing in (7) we can conclude that the worst case complexity of an AAOSA parser representing a context-free grammar is:

$$O(n(m+n)^2) \qquad (8)$$

Figure 8:
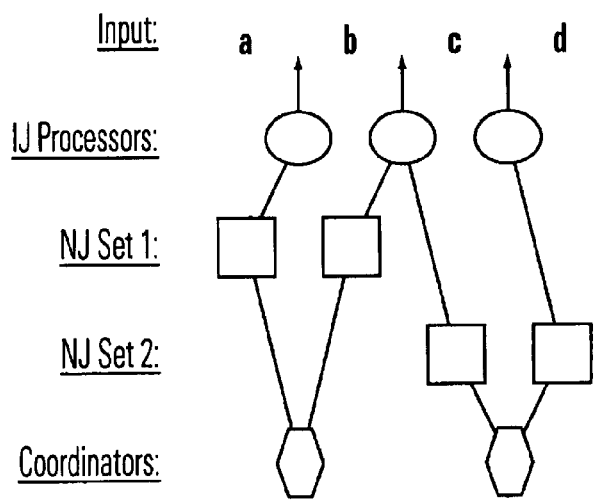
FIG. 8 illustrates a parallel algorithm for an agent.

So far, we are assuming that only the agents are capable of running in parallel. A parallel algorithm can be used for the agents themselves, as illustrated in FIG. 8.

We use n−1 processors in each agent, each to be responsible for one of the n−1 junctions between input elements (we call these IJ processors). If we use a maximum of (m−1) processors, each processor representing a junction of two non-terminal symbols in the interpretation policy (NJ processor), we will need a maximum of (n−m). sets of these processors for every possible combination of the input junctions (NJ sets). A top coordinator processor is also needed for each NJ set. Each IJ processor stores all claims that are adjacent at the junction it represents. NJ processors in each NJ set are connected to their respective IJ processors and receive from them all claims with the symbols adjacent at the junction that they represent. The coordinator processors make new claims if all the processors in their respective NJ set return successful claim matches.

We will need m(n−m)+n−1 processors in each agent, therefore the total number of processors needed would be m(m(n−m)+n−1). We would also need m processors, one for each agent. The total number of processors will therefore be:

$$O(m^2(m(n-m)+n-1))=O(m^3n)$$

Thus, the time complexity for each agent's claim making will be reduced to a constant. It follows that the worst case time complexity of the fully parallel version of the AAOSA parser for context-free grammars is:

$$O((m+n)^2)$$

6. AAOSA and Natural Language User Interfaces

Most human-computer interfaces being used today are complicated and difficult to use. This is due mostly to the growing number of features the interface should provide easy access to.

Users usually have the following problems with current interface:

Prior to selecting an action. They have to consider if the application provides an appropriate action at all. This hints on a need for some sort of feedback from the application.

It is hard to access the actions they already know about. This implies that the user should be able to freely express his or her needs without being bound to the limited conventions preset by the application.

They have to imagine what would be an appropriate action to proceed with in order to perform a certain task of the application domain. The application, therefore, should be able to guide the users through the many options they may at any stage of the interaction.

Thus, some of the desirable features in a user interface may be as follows:

Natural expression: The user should be able to express his or her intentions as freely and naturally as possible.

Optimum interaction: Interaction should be limited to the following:

The user is in doubt as to what she can do next or how she can do it.

The system is in doubt as to what the user intends to do next.

Adaptability: Adaptability could be about the changing context of interaction or application, but most importantly, the system should be able to adapt to the user's way of expressing her intentions. Two main issues that will have to be taken into account in this regard are generalization and contradiction recovery:

Generalization: An adaptable system in its simplest form will only learn the instance that it has been taught (implicitlyor explicitly). Generalization occurs when the system uses what it has learned to resolve problems it deems similar. The success and degree of generalization, therefore, depend directly on the precision of the similarity function and the threshold the system uses to distinguish between similar and dissimilar situations.

Contradiction: A system that generalizes may well over-generalize. The moment the system's reaction based on a generalization is in a manner the user does not anticipate, the system has run into a contradiction. The resolution of this contradiction is an integral part of the learning and adaptability process.

Ease of change and upgrade: The application designer should easily be able to upgrade or change the system with minimum compromise to the adaptation the system has made to users.

This change should be done at run-time (i.e., on the fly).

6.1 Extending the AAOSA Parser

Although, as shown in section 4, a grammatical parser can be implemented using AAOSA, practical problems force us to make some improvements to it. Creating a grammar, be it context-sensitive, is a complicated task. Changing grammars based on learning (section 5) is also difficult. Grammars alone are not enough to fulfill the requirements noted above.

Furthermore, parsing alone is not sufficient either. A parser, after all, tells us if the input string belong to a language or not. Our objective though, is to find the best match for any given input. This means the AAOSA system:

Should be able to accept non-grammatical input (e.g., "Tea for Jila bring!"),

Should be able to handle previously encountered input (e.g., "Yabadabadee some milk for me!").

On the other hand, AAOSA should also be able to pinpoint the semantic sub-domains responsible for responding to input. Therefore, we propose a semantic approach to the problem of grammar definition. The designer of a natural language interface application should design a semantic hyperstructure of agents. The input agent at the top would be responsible for receiving input and initiating the query and delegation phase, and the agents representing the functionality of the system would be lowest order nodes of the hyperstructure.

The interpretation policies should be much fuzzier than that of the parser. For instance, rather than requiring the claims on which a new claim is based to be in sequence (step V in section 4), we can require them only to be exclusive. Two claims $C_1$ and $C_2$ are exclusive ($C_1 \otimes C_2$) if:

$$\forall i, 0 \leq i < \text{length}(\text{focus}(C_1)), \neg \exists j, 0 \leq j < \text{length}(\text{focus}(C_2)) |$$

$$s(\text{focus}(C_1[i])) \leq s(\text{focus}(C_2[j])) \leq e(\text{focus}(C_1[i])) V$$

$$s(\text{focus}(C_1[i])) \leq e(\text{focus}(C_2[j])) \leq e(\text{focus}(C_1[i]))$$

It can be shown that:

$$C_1 \otimes C_2 \Leftrightarrow C_2 \otimes C_1$$

The interpretation policies will determine what the best reduction condition is and each agent will compute a confidence factor for its claims based on the extent the reduced claims differ from the desired ones. Using a threshold, claims of higher confidence are used as query responses. For instance, take the grammatical rule A→BC as an interpretation policy. The desired relative position of B and C, according to the definition of grammatical production rules, is that B<<C. But in our proposed system it would be enough for B and C to be exclusive. A number of heuristics may be used to approximate the extent of difference from the desired status (e.g., differences in order or proximity of the foci). Confidence in the claims themselves will also have to be taken into account when basing a new claim on them.

Another main difference between the parser and our proposed natural language system is that the context considered in the reductions of a context-sensitive grammar is limited to the input. In the real world, though, the decision to make a claim may be made based on context information that is not necessarily present in the input. For instance, an AAOSA agent may decide to make a claim based on the history of successful-claims made, or the status of the semantic domain it is representing, or even based on interactions with the user.

6.2 The Robot Servant Example

We will explain our implementation on a toy problem: A robot is to run certain errands around the house using a natural language interface. We will start with a limited set of functions and show that this set is extendible:

Serve tea, biscuits or sandwiches,

Make telephone calls.

Figure 9:
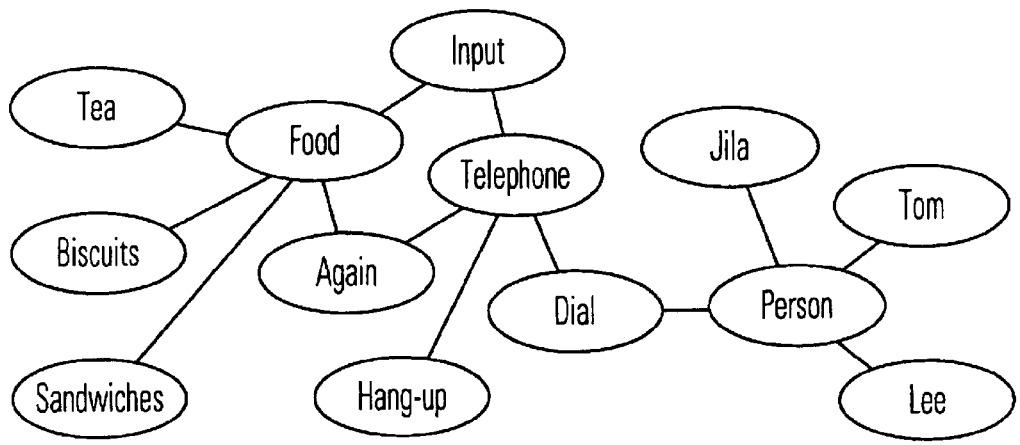
FIG. 9 illustrates an agent network hyperstructure for the robot servant example.

The idea is to distribute the natural language processing over nodes that represent different levels of a hyperstructure covering the functionality space. One example of such an hyperstructure is given in FIG. 9. A detail of part of this hyperstructure is given in FIG. 6.

Figure 6:
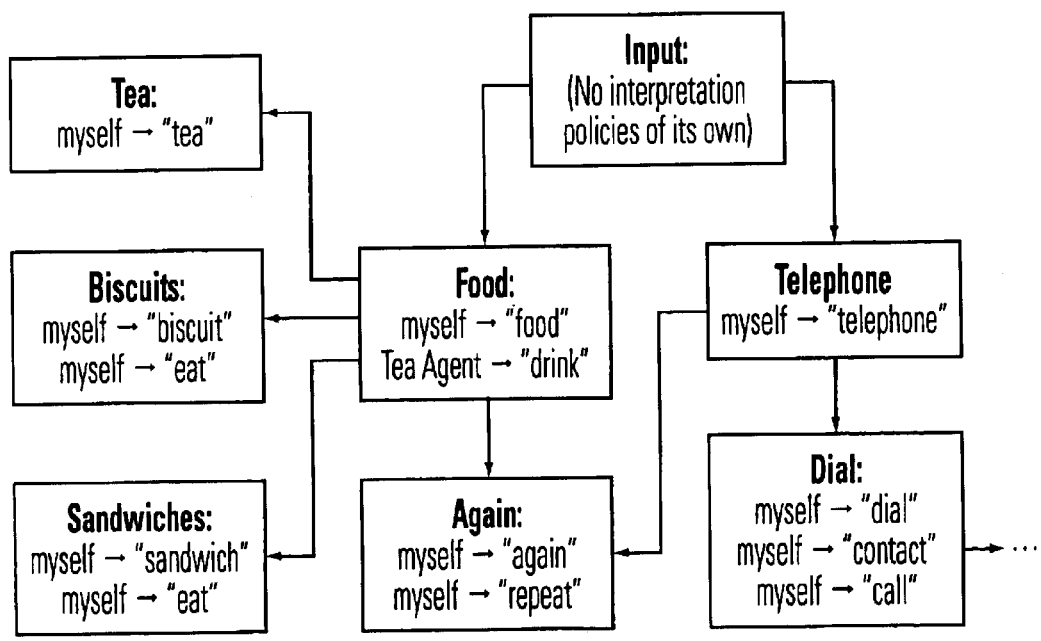
FIG. 6 illustrates a detail of part of the hyperstructure of FIG. 9.

The natural language interpretation is done through a series of claims and delegations carried out by the agents. Agents claim an input string as belonging to them (internal interpretation), or decide that it belongs to some other agent or agents based on their interpretation policies (transitive interpretation). Agents that are not able to find appropriate policies that interpret certain input will consult down-chain agents. In our example the sandwich agent claims input such as "I want a sandwich" because of the presence of "sandwich" (FIG. 6). In this case, the presence of the keyword "Sandwich" is the interpretation policy. An example oftransitive interpretation would be in the case of the input, "I want to drink"; in which case the processing is delegated to the tea agent by the food agent based on the presence of the keyword "drink" which is a clue as to what kind of food the user is referring to.

As mentioned before processing of input is done in two phases: interpretation and delegation. For example, let us say the input agent takes "Give me biscuits!". This agent itself can not claim the input without consulting other down-chain agents. These agents (Food and Telephone agents), in turn are not capable of interpreting and therefore ask their respective down-chain agents. The Biscuit agent claims this input based on the presence of the keyword "biscuits" and answers the Food agent's question positively, causing the Food agent to send a similar affirmative response to the Input agent.

So far, no processing has been done. It is now up to the initiator agent (i.e., the Input agent) to decide whether this input should be actuated. Upon actuation, agents use temporarily stored interpretation results to send the actuation request down to the responsible agents and have them execute the necessary processes without having to reinterpret the input. In our example, "Give me biscuits!", the Biscuit agent will be sent down the actuation command and it will issue the necessary commands needed for the robot to get some biscuits.

Ambiguities occur when the interpretation of input is not possible because of there not being any agents to claim it, or more than one agent claiming it. In the first case something unknown to the system has been inputted and should be clarified and possibly learned by the agents. Take for example the input: "I'm thirsty!". Let's say none of the agents claims this input. In this case, the input agent can ask the user whether "I'm thirsty!" has something to do with telephones or food (i.e., its immediate down-chain agents). The result of this interaction may be learned by the Input agent (e.g., Input agent learns that the input "I'm thirsty!" should be delegated to the Food agent). The Food agent, in turn not being able to interpret, will ask the user whether "I'm thirsty!" has anything to do with tea, biscuits, or sandwiches. Eventually it is up to the Tea agent to learn that "I'm thirsty!" belongs to it. To keep the responsibilities from drifting up-chain or down-chain in the hyperstructure of agents, the Tea agent should at this point declare to it's up-chain agents (in this case the Food agent) to remove any interpretations of "I'm thirsty!" that result in the delegation of the input to the tea agent (i.e., uses the Un-learn performative). The Food agent, having received an Un-learn performative and processed it, should in turn propagate it further up-chain.

Another example of ambiguity is when the natural language input is vague. For example, "I want to eat!" would cause the Biscuit agent and the Sandwich agent both to claim it.

By adding agents to the system, we can extend its capabilities. An example would be adding fax capability to the system in which Fax agent will be added at the same level as the Telephone agent connecting to the same down-chain agents as the telephone agent. Note that by doing so we have also added ambiguity to the system. For instance, "Contact Jila" may result in both the Fax and Telephone agents claiming it.

Some of the interesting attributes of our interface are as follows:

It is modeless, in that the user does not have to follow preset menus in order to achieve her intentions; (e.g., "Tea!" is a valid input).

It supports context-based interaction (e.g., If you have just ordered it to "Get some tea!" and follow that order up with "Again!" it can resolve the ambiguity between the Telephone and Food agents based on this context information, namely recency of invocation.)

It can be upgraded easily to be able to handle Multilingual input because each agent's interpretation policy is relatively simple and the grammar and semantics are mostly handled over the architecture.

When mistakes are made by the system graceful error recovery can be achieved by backtracking to the furthest down-chain point of ambiguity resolved implicitly and interact with the user to resolve it. For instance in the "Again!" example if the user really means a re-dial should be attempted, she can express her dissatisfaction by, say, pressing the escape key, and the system will respond with: "Should I re-dial the phone or bring you tea again?"

Handles incomplete, unpredictable, and grammatically incorrect input. This is possible due to the simple interpretation policies in each agent and the fact that agents can extend their interpretation policies by learning.

Relatively small memory/processor requirements with respect to similar interfaces based on classical Natural Language Processing methods.

6.3 Home Theater System Example

In other embodiments, AAOSA can be used as a natural language interface to electronic messenger systems, home theater systems, and for other applications as well. Table 4 sets forth certain notable features in the home theater system embodiment.

hosts. Run-time addition of new AAOSA agents is possible and therefore incremental development and evaluation is possible. Following guidelines set by the original designer; other designers can also contribute to a system making it commercially attractive. The built-in learning and ambiguity resolution features make AAOSA a more intelligent software architecture.

As used herein, the term "message" includes, among other things, queries, commands, and responses to queries. A message is considered herein to be within the domain of responsibility of a given agent if: (a) the message, or part of it, is within the given agent's local domain of responsibility (i.e., the special processing unit of the agent has itself been assigned the responsibility to take some action in response to the message, or in response to part of the message), and/or (b) the message, or part of it, is within the given agent's downchain domain or responsibility (i.e., the agent knows of one or more further agents to whom the message should be routed).

In some embodiments, the arrangement of agents might, for example, satisfy the definition of a hyperstructure. In general, the arrangement of agents can be described as a network. It will be appreciated that hyperstructures and hierarchies are special cases of a network. Furthermore, a simple chain of agents is a special case of a hierarchy and a single agent is a special case of a chain of agents. All these forms and others are considered herein to be kinds of networks.

TABLE 4

| Notes | User | System |
| --- | --- | --- |
| 1. Flexibility | "Show me ESPN" | [Channel jumps to 206 on DSS] |
|  | "Put on freakin' CNN" | [Channel jumps to 202 on DSS] |
|  | "Mute the sound and change to HBO and put ABC in the window." | [Sound is muted] [Channel jumps to 910 on DSS] [Picture in picture is put on and switched to channel 7] |
| 2. Ambiguity | "play" | "Would you like to play, the VCR or the DVD?" |
|  | "The VCR!" | [VCR starts playing] |
| 3. Context-based ambiguity resolution (DVD and VCR can both "stop") | "Stop it!" | [VCR stops playing] |
| 4. Ambiguity based Query handling | "What can I do with the lights?" | "Would you like to turn the lights on or off, or set them at a specific level?" |
| 5. Learning | "Sports channel" | "Would you like to go to the next or previous channel or jump to a specific one?" |
|  | "I mean ESPN" | [Channel jumps to 206 on DSS] |
| 6. Complex operations | "Record the Sports channel in half an hour" | [Okay] |
| 7. Limited scope | "What! You can do that?" | "Would you like to use the TV, the VCR, the DVD, or the lights?" |

Embodiments of AAOSA can been implemented in Java because of its unique portability and multi-platform execution capabilities and multi-threading features. They can use simple rote learning as the learning module in the white-box, or other, more robust machine learning methods may be used.

7. Conclusions

The AAOSA software architecture can be used to effectively implementation a natural language interactive interface. The architecture is flexible, primarily because there is no rigid predetermination of valid input. It is modular providing for easier revision, extension and development. AAOSA agents can be re-used inside an application or in other software. The independent nature of AAOSA agents provides for an inherently parallel architecture. Agents can run and communicate over a network of heterogeneous As used herein, an agent which is part of a community of agents all having the same domain of responsibility can be queried, in an appropriate embodiment, by querying the community of which it is part. That is, the querying of a group of agents is considered herein to include the querying of one or more agents within the group.

As used herein, a given message, signal or event is "responsive" to a predecessor message, signal or event if the predecessor signal or event influenced the given signal or event. If there is an intervening processing element or time period, the given message, event or signal can still be "responsive" to the predecessor signal or event. If the intervening processing element combines more than one message, signal or event, the output of the processing element is considered "responsive" to each of the message, signal or event inputs. If the given message, signal or event is the same as the predecessor message, signal or event, this is merely a degenerate case in which the given message, signal or event is still considered to be "responsive" to the predecessor message, signal or event.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A computer-implemented method for use in deriving user intent from a subject message, for use further with a network of agents each having a view of its own natural language interpretation domain, the network including a first agent, an upchain agent udchain of said first agent, and a plurality of immediately downchain agents each immediately downchain of said first agent, comprising the steps of:

said first agent receiving from said upchain agent a first query inquiring whether at least part of said subject message is within the natural language interpretation domain of said first agent;

said first agent querying each of said plurality of immediately downchain agents whether the queried agent considers at least part of said subject message to be in the queried agent's natural language interpretation domain; and said first agent responding to said upchain agent tentatively whether at least part of said subject message is within the natural language interpretation domain of said first agent, after said first agent receives at least one response from said immediately downchain agents, but before said first agent receives all responses from said immediately downchain agents.

2. A method according to claim 1, further comprising the step of, after said step of responding, said first agent responding further to said upchain agent whether at least part of said subject message is within the natural language interpretation domain of said first agent, after said first agent receives at least one additional response from said immediately downchain agents.

3. A method according to claim 2, wherein said step of said first agent responding further occurs in response to a second query received by said first agent from said upchain agent inquiring whether at least part of said subject message is within the natural language interpretation domain of said first agent.

4. A method according to claim 2, wherein said step of said first agent responding further occurs in response to said first agent receiving said at least one additional response.

5. A method according to claim 1, wherein said first query includes a first depth-of-search indication, further comprising the steps of said first agent:

resolving any conflicting responses from said queried agents to identify a prevailing one of said immediately downchain agents to whom said subject message should be passed; and instructing said prevailing agent to handle at least part of said subject message.

6. A method according to claim 5, further comprising the steps of a particular one of said queried agents, in response to said query:

determining whether a depth of said particular agent exceeds said depth of search indication, and if so, disclaiming said subject message.

7. A method according to claim 5, further comprising the steps of a particular one of said queried agents, in response to said query where a depth of said particular agent does not exceed said depth of search indication:

determining whether at least part of said subject message is within said particular agent's local natural language interpretation domain, and if so, returning a response to said first agent claiming at least part of said message.

8. A method according to claim 5, further comprising the steps of a particular one of said queried agents, in response to said query where a depth of said particular agent does not exceed said depth of search indication:

determining whether at least part of said subject message is within said particular agent's local natural language interpretation domain;

and where said subject message is not within said particular agent's local natural language interpretation domain but said particular agent has further agents downchain of said particular agent, querying at least one of said further agents whether the further agent considers at least part of said subject message to be in the further agent's natural language interpretation domain.

9. A method according to claim 5, further comprising the step of, after said step of querying said immediately downchain agents a first time, querying said immediately downchain agents a second time whether the queried agent considers at least part of said subject message to be in the queried agent's natural language interpretation domain.

10. A method according to claim 9, wherein said second query includes a second depth-of-search indication which exceeds said first depth-of-search indication.

11. A computer-implemented method for processing a subject message, by a network of agents including an originating agent, at least one agent downchain of said originating agent, and a plurality of agents each immediately downchain of a first one of said agents downchain of said originating agent, each agent in said network having a view of its own natural language interpretation domain, comprising the steps of:

said originating agent querying at least said first agent a first time, whether the first agent considers at least part of said subject message to be in the first agent's natural language interpretation domain;

in response to said first query to said first agent, said first agent querying each of said agents immediately downchain of said first agent, whether the immediately downchain agent considers at least part of said subject message to be in the immediately downchain agent's natural language interpretation domain;

in response to said first agent receiving at least one response from said immediately downchain agents but without waiting to receive responses from all of said immediately downchain agents, said first agent responding to said originating agent whether at least a part of said subject message is within the natural language interpretation domain of said first agent;

said originating agent subsequently querying said first agent a second time whether the first agent considers at least part of said subject message to be in the first agent's natural language interpretation domain;

said originating agent resolving any conflicting responses from said agents downchain of said originating agent to identify a prevailing one of said agents downchain of said originating agent to whom at least part of said subject message should be passed; and said originating agent instructing said prevailing agent to handle at least part of said subject message.

12. A method according to claim 11, wherein said prevailing agent is a community of agents.

13. A method according to claim 11, further comprising the steps of a second one of said agents queried in said step of said originating agent querying a first time:

determining whether at least part of said subject message is within said second agent's local natural language interpretation domain;

and where at least part of said subject message is within said second agent's local natural language interpretation domain, returning a response to said originating agent claiming at least part of said subject message.

14. A method according to claim 11, further comprising the steps of a second one of said agents queried in said step of said originating agent querying a first time:

determining whether at least part of said subject message is within said second agent's local natural language interpretation domain;

and where said subject message is not within said second agent's local natural language interpretation domain and said second agent has no further downchain agents, returning a response to said originating agent disclaiming said subject message.

15. A method according to claim 11, further comprising the steps of a second one of said agents queried in said step of said originating agent querying a first time:

determining whether at least part of said subject message is within said second agent's local natural language interpretation domain;

and where said subject message is not within said second agent's local natural language interpretation domain but said second agent has further agents downchain of said second agent, querying at least one of said further agents whether the further agent considers at least part of said subject message to be in the further agent's natural language interpretation domain.

16. A method according to claim 11, wherein said step of said originating agent querying a first time comprises the step of providing to each agent queried in said step of said originating agent querying a first time, a first depth-of-search indication for said subject message, and wherein said step of said originating agent querying a second time comprises the step of providing to each agent queried in said originating agent querying a second time, a second depth-of-search indication for said subject message, said second depth-of-search indication indicating a deeper search than said first depth-of-search indication.

17. A method according to claim 11, further comprising the steps of a particular one of said agents immediately downchain of said first agent:

determining in response to said first query whether at least part of said subject message is within said particular agent's local natural language interpretation domain;

where at least part of said subject message is within said particular agent's local natural language interpretation domain, returning a response to said first agent claiming at least part of said subject message; and where said subject message is not within said particular agent's local natural language interpretation domain but said particular agent has further agents downchain of said particular agent, querying in response to said second query at least one of said further agents whether the further agent considers at least part of said subject message to be in the further agent's natural language interpretation domain.

18. A method according to claim 17, further comprising the steps of said particular queried agent:

receiving a group of at least one response from said further agents downchain of said particular agent, in response to said step of querying said further agents; and returning a response to said first agent in response to said step of receiving.

* * * * *